(12) United States Patent
Yamaguchi et al.

(10) Patent No.: US 7,965,523 B2
(45) Date of Patent: Jun. 21, 2011

(54) SWITCHING POWER SUPPLY DEVICE

(75) Inventors: Naoki Yamaguchi, Nagaokakyo (JP);
Tatsuya Hosotani, Muko (JP); Takuji Yokawa, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 151 days.

(21) Appl. No.: 12/551,584

(22) Filed: Sep. 1, 2009

(65) Prior Publication Data

US 2009/0316444 A1    Dec. 24, 2009

Related U.S. Application Data

(63) Continuation of application No. PCT/JP2008/063728, filed on Jul. 31, 2008.

(30) Foreign Application Priority Data

Aug. 17, 2007    (JP) ................................. 2007-212942

(51) Int. Cl.
*H02M 3/335*    (2006.01)
(52) U.S. Cl. ....... 363/21.12; 363/16; 363/19; 363/21.16
(58) Field of Classification Search ............... 363/16, 363/19, 21.01, 21.07, 21.12, 21.14, 21.16, 363/45, 97, 131
See application file for complete search history.

(56) References Cited

U.S. PATENT DOCUMENTS

| | | | | |
|---|---|---|---|---|
| 6,061,252 | A | * | 5/2000 | Hosotani ....................... 363/16 |
| 6,639,811 | B2 | * | 10/2003 | Hosotani et al. ............... 363/19 |
| 7,113,411 | B2 | * | 9/2006 | Hosotani et al. ............... 363/16 |
| 7,414,864 | B2 | * | 8/2008 | Hosotani et al. ........... 363/21.16 |
| 2006/0062024 | A1 | | 3/2006 | Hosotani et al. |
| 2006/0176715 | A1 | | 8/2006 | Hosotani et al. |

FOREIGN PATENT DOCUMENTS

| | | |
|---|---|---|
| JP | 2000-116126 A | 4/2000 |
| JP | 2007-189779 A | 7/2007 |
| WO | 2005/074113 A1 | 8/2005 |
| WO | 2005/076448 A1 | 8/2005 |

OTHER PUBLICATIONS

Official Communication issued in International Patent Application No. PCT/JP2008/063728, mailed on Oct. 28, 2008.

* cited by examiner

*Primary Examiner* — Jeffrey L Sterrett
*Assistant Examiner* — Gary Nash
(74) *Attorney, Agent, or Firm* — Keating & Bennett, LLP

(57) ABSTRACT

In a switching power supply device, a first switch element, which defines a main switch element of a DC-DC converter, and a third switch element, which defines a switch element of a power-factor correcting circuit, are controlled such that turn-on timings are synchronized while on-period control is independently performed to thereby prevent an increase in switching frequency and prevent noise by eliminating intermittent oscillation. Thus, it is possible to prevent intermittent oscillation control due to an increase in switching frequency of the first switch element under a light load state or a no load state. This eliminates problems of the frequency of intermittent oscillation that falls within an audible frequency range causing noise and increasing ripple voltage.

40 Claims, 13 Drawing Sheets

US 7,965,523 B2

SWITCHING POWER SUPPLY DEVICE

BACKGROUND OF THE INVENTION

1. Field of the Invention

The present invention relates to a switching power supply device that interrupts electric power supplied from an input power supply and that converts electric power via an inductor to output a predetermined direct-current voltage.

2. Description of the Related Art

Generally, performance indicia of a switching power supply device include a harmonic characteristic and a power factor characteristic. The harmonic characteristic is a function of suppressing flow of harmonic current from the switching power supply device to its input power supply line. An upper limit of the harmonic current is regulated so as not to adversely influence another device. In addition, the power factor characteristic is a power factor when an input is viewed from the switching power supply device. The power factor is preferably relatively high in order to reduce a loss in an electric power system.

In the related art, the switching power supply device described in International Patent Application Publication No. W02005/074113 or Japanese Unexamined Patent Application Publication No. 2000-116126 has been provided.

FIG. 12 shows an example of the configuration of a switching power supply device of International Patent Application Publication No. W02005/074113. In FIG. 12, a first switch circuit (S1) is defined by a parallel circuit including a first switch element (Q1), a first diode (D1) and a first capacitor (Cds1), and a second switch circuit (S2) is defined by a parallel circuit including a second switch element (Q2), a second diode (D2) and a second capacitor (Cds2).

Vin is an input power supply, and is a commercial alternating current power supply. Vin is rectified by a rectifier diode (Da) via an EMI filter (EMI-F). T is a transformer. The transformer T defines a closed loop including a primary coil (Lp), a first inductor (Lr), the first switch circuit (S1) and the rectifier diode (Da). The transformer T connects a series circuit of a second switch circuit (S2) and a capacitor (Cr) to a series circuit of the primary coil (Lp) and the first inductor (Lr) in parallel with each other.

A rectifying/smoothing circuit defined by a rectifier diode (Ds) and a smoothing capacitor (Co) is provided for a secondary coil (Ls) of the transformer (T). A capacitor (Cs) is connected in parallel with the secondary-side rectifier diode (Ds).

A feedback circuit (FB1) detects a voltage (Vo) output from the rectifying/smoothing circuit (RS) to an output terminal (OUT), and performs feedback control so that the voltage (Vo) is stable. A first switching control circuit (SC1) inputs a voltage generated at a drive coil (Lb1) to control an off timing of the first switch element (Q1), thus controlling an on period of the first switch element (Q1).

A second switching control circuit (SC2) inputs a voltage generated at a drive coil (Lb2) to control an off timing of the second switch element (Q2), thus controlling an on period of the second switch element (Q2). In addition, one end of a second inductor (Li) is connected to a connecting point of the first switch circuit (S1) and the second switch circuit (S2), and the other end of the second inductor (Li) is connected to a third diode Di. In addition, both ends of a fourth diode (Dc) are respectively connected to a connecting point of the second switch circuit (S2) and a fifth capacitor (Cr) and a connecting point of the third diode (Di) and the second inductor (Li).

A fourth capacitor (Ci) is connected between a connecting point of the first switch circuit (S1) and a third capacitor (Ca) and one end of the first inductor (Lr).

The switching control circuits (SC1 and SC2) are respectively connected to the first and second switch circuits (S1 and S2). A fourth diode (Db) is connected between the input-side rectifier circuit (Da) and the fourth capacitor (Ci).

The switching control circuit (SC1) includes a transistor (Tr1), a delay circuit (DL1) and a time-constant circuit (TC1) connected between the gate and source of the first switch element (Q1). The delay circuit (DL1) is defined by a series circuit, including a capacitor (Cg1) and a resistor (Rg1), and an input capacitance (not shown) of the switch element (Q1). The first switch element (Q1) turns on by a voltage induced by the drive coil (Lb1), and a turn-on timing of Q1 is delayed by the delay circuit (DL1).

The time-constant circuit (TC1) includes a capacitor (Ct1) and an impedance circuit including a resistor (Rt1), a diode (Dt1), and a phototransistor (Pt1) of a photocoupler. The time-constant circuit (TC1) and the transistor (Tr1) control an on period of the first switch element (Q1).

The second switching control circuit (SC2) also has a similar configuration to that of the first switching control circuit (SC1), and operates similarly.

The feedback circuit (FB1) is connected to the phototransistor (Pt1) of the photocoupler of the first switching control circuit (SC1). The feedback circuit (FB1) detects a voltage (Vo) output from the rectifying/smoothing circuit (RS) to the output terminal (OUT), and performs feedback control such that the voltage (Vo) is stable. A second feedback circuit (FB2) detects an input voltage (Vi) of the fourth capacitor (Ci), and performs feedback control such that the on period of the second switch element (Q2) is controlled so that the input voltage (Vi) does not increase beyond a predetermined value under a light load.

FIG. 13 shows an example of the configuration of a switching power supply device shown in FIG. 6 of Japanese Unexamined Patent Application Publication No. 2000-116126. In FIG. 13, a series circuit including a reactor (L1) and a diode (D1) is connected to one end of an output terminal of a diode bridge (DB) that rectifies a commercial power supply (VAC), a smoothing capacitor (C1) is connected between the diode (D1) and the other end of the output terminal of the diode bridge (DB), and a switch element (S1) is connected between a connecting point of the reactor (L1) and the diode (D1) and a connecting point of the diode bridge (DB) and the capacitor (C1).

In addition, a partial voltage resonance DC/DC converter is provided so that a series circuit including a primary coil of an isolation transformer (TR1) and a main switch element (S2) is connected in parallel with a positive electrode terminal and negative electrode terminal of the smoothing capacitor (C1), a series circuit including a capacitor (C5) and an auxiliary switch element (S3) is connected between a connecting point of the isolation transformer (TR1) and the main switch element (S2) and the positive electrode terminal of the smoothing capacitor (C1), and capacitors (C4 and C3) are respectively connected in parallel with the main switch element (S2) and the auxiliary switch element (S3). In addition, diodes (D3 and D4) are respectively connected in antiparallel with the main switch element (S2) and the auxiliary switch element (S3). That is, the diodes (D3 and D4) are respectively connected in parallel with the main switch element (S2) and the auxiliary switch element (S3) and current flows through the diodes (D3 and D4) in a direct opposite to the direction in which current flows through the switch element (S2) and the auxiliary switch element (S3). In addition, a series circuit including the diode (D2) and the capacitor (C2) is connected between both ends of a secondary coil of the isolation transformer, and both ends of the capacitor (C2) define a direct-current output terminal.

However, as described in Claim 19 of International Patent Application Publication No. W02005/074113, the switching power supply device enters an intermittent oscillation mode under a light load state or a no load state. In the intermittent oscillation mode, an oscillation period and an interruption period are periodically repeated.

In this case, the frequency of intermittent oscillation falls within an audible frequency range, and may possibly cause noise.

In addition, there is a problem in that a ripple of an output voltage increases because of the intermittent oscillation.

In addition, in Japanese Unexamined Patent Application Publication No. 2000-116126, a power-factor correcting circuit and the partial resonance DC/DC converter are separately controlled. Thus, there is a problem in that a beat interference may occur because of interference between different switching frequencies or a control circuit becomes complex because a protection circuit and a control circuit for overcurrent and their voltage sources are required.

SUMMARY OF THE INVENTION

To overcome the problems described above, preferred embodiments of the present invention provide a switching power supply device that not only improves the harmonic current reducing effect, the harmonic characteristics, and the power factor characteristics, but also has a simple control circuit which prevents noise under a light load state or a no load state and an increase in ripple voltage.

A switching power supply device according to a preferred embodiment of the present invention includes a first switch circuit defined by a parallel-connected circuit including a first switch element, a first diode, and a first capacitor; a second switch circuit defined by a parallel-connected circuit including a second switch element, a second diode, and a second capacitor; a third switch circuit defined by a parallel-connected circuit including a third switch element, a third diode, and a third capacitor; an input-side rectifier circuit defined by at least one rectifying element that rectifies an alternating input voltage; a fourth capacitor, to which a voltage rectified by the rectifier circuit is applied; a transformer that includes at least a primary coil, a secondary coil, a first drive coil, and a second drive coil; a rectifying/smoothing circuit that is connected to the secondary coil; a first inductor that is connected in series with the primary coil; a second inductor that is connected so that a voltage of the fourth capacitor is applied to the second inductor during an on period of the third switch circuit that operates such that the on period of the third switch circuit is included in an on period of the first switch circuit; a fourth diode of which an anode is connected to one end of the second inductor and a cathode is connected to one end of the second switch element in order to prevent a backward current from flowing to the second inductor; a fifth capacitor that is connected so that the fifth capacitor is charged with exciting energy stored in the second inductor and applies a voltage to a series circuit, defined by the primary coil and the first inductor, during the on period of the first switch circuit; a sixth capacitor that is connected in parallel with the primary coil of the transformer and that defines a series circuit with the second switch circuit; a first switching control circuit and a second switching control circuit that alternately turn on or off the first and second switch elements with an intervening period during which both the first and second switch elements turn off; and a switching control circuit that turns on or off the third switch element, wherein each of the first switching control circuit and the third switching control circuit operates on a voltage generated at the first drive coil, and the second switching control circuit operates on a voltage generated at the second drive coil.

A switching power supply device according to another preferred embodiment of the present invention includes a first switch circuit defined by a parallel-connected circuit including a first switch element, a first diode, and a first capacitor; a second switch circuit defined by a parallel-connected circuit including a second switch element, a second diode, and a second capacitor; a third switch circuit defined by a parallel-connected circuit including a third switch element, a third diode, and a third capacitor; an input-side rectifier circuit defined by at least one rectifying element that rectifies an alternating input voltage; a fourth capacitor, to which a voltage rectified by the rectifier circuit is applied; a transformer that includes at least a primary coil, a secondary coil, a first drive coil, and a second drive coil; a rectifying/smoothing circuit that is connected to the secondary coil; a first inductor that is connected in series with the primary coil; a second inductor that is connected so that a voltage of the fourth capacitor is applied to the second inductor during an on period of the third switch circuit that operates such that the on period of the third switch circuit is included in an on period of the first switch circuit; a fourth diode of which an anode is connected to one end of the second inductor and a cathode is connected to one end of the second switch element in order to prevent a backward current from flowing to the second inductor; a fifth capacitor that is connected so that the fifth capacitor is charged with exciting energy stored in the second inductor and applies a voltage to a series circuit defined by the primary coil, the first inductor and a sixth capacitor, during the on period of the first switch circuit; the sixth capacitor that is inserted in series between the fifth capacitor and the first inductor; a first switching control circuit and a second switching control circuit that alternately turn on or off the first and second switch elements with an intervening period during which both the first and second switch elements turn off; and a switching control circuit that turns on or off the third switch element, wherein each of the first switching control circuit and the third switching control circuit operates on a voltage generated at the first drive coil, and the second switching control circuit operates on a voltage generated at the second drive coil.

A switching power supply device according to another preferred embodiment of the present invention includes a first switch circuit defined by a parallel-connected circuit including a first switch element, a first diode, and a first capacitor; a second switch circuit defined by a parallel-connected circuit of a second switch element, a second diode, and a second capacitor; a third switch circuit defined by a parallel-connected circuit including a third switch element, a third diode, and a third capacitor; an input-side rectifier circuit defined by at least one rectifying element that rectifies an alternating input voltage; a fourth capacitor, to which a voltage rectified by the rectifier circuit is applied; a transformer that includes at least a primary coil, a secondary coil, a first drive coil, and a second drive coil; a rectifying/smoothing circuit that is connected to the secondary coil; a first inductor that is connected in series with the primary coil; a second inductor that is connected so that a voltage of the fourth capacitor is applied to the second inductor during an on period of the third switch circuit that operates such that the on period of the third switch circuit is included in an on period of the first switch circuit; a fifth capacitor that is connected so that the fifth capacitor is charged with exciting energy stored in the second inductor and applies a voltage to a series circuit, defined by the primary coil, the first inductor, and a sixth capacitor, during the on period of the first switch circuit; the sixth capacitor of which one end is connected to the primary coil of the transformer and the other end is connected to a connecting point of the first switch circuit and the second switch circuit; a fourth diode of which an anode is connected to one end of the second inductor and a cathode is connected to a connecting point of the primary coil of the transformer and the sixth capacitor in order to prevent a backward current from flowing to the second inductor; a first switching control circuit and a second switching control circuit that alternately turn on or off the first and second switch elements with an intervening period during which both the first and second switch elements turn off; and a switching control circuit that turns on or off the third switch element, wherein the first switching control circuit and each of the third switching control circuit operates on a voltage generated at the first drive coil, and the second switching control circuit operates on a voltage generated at the second drive coil.

A switching power supply device according to another preferred embodiment of the present invention includes a first switch circuit defined by a parallel-connected circuit including a first switch element, a first diode, and a first capacitor; a second switch circuit defined by a parallel-connected circuit including a second switch element, a second diode, and a second capacitor; a third switch circuit defined by a parallel-connected circuit including a third switch element, a third diode, and a third capacitor (Cds3); an input-side rectifier circuit defined by at least one rectifying element that rectifies an alternating input voltage; a fourth capacitor, to which a voltage rectified by the rectifier circuit is applied; a transformer that includes at least a primary coil, a secondary coil, a first drive coil, and a second drive coil; a rectifying/smoothing circuit that is connected to the secondary coil; a first inductor that is connected in series with the primary coil; a second inductor that is connected so that a voltage of the fourth capacitor is applied to the second inductor during an on period of the third switch circuit that operates such that the on period of the third switch circuit is included in an on period of the first switch circuit; a fifth capacitor that is connected so that the fifth capacitor is charged with exciting energy stored in the second inductor and applies a voltage to a series circuit, defined by the primary coil and the first inductor, during the on period of the first switch circuit; a sixth capacitor that defines a series circuit, which is connected in parallel with both ends of the first switch circuit, with the second switch circuit; a first switching control circuit and a second switching control circuit that alternately turn on or off the first and second switch elements with an intervening period during which both the first and second switch elements turn off; and a switching control circuit that turns on or off the third switch element, wherein each of the first switching control circuit and the third switching control circuit operates on a voltage generated at the first drive coil, and the second switching control circuit operates on a voltage generated at the second drive coil.

Preferably, the switching power supply device further includes a fifth diode of which an anode terminal is connected to the input-side rectifier circuit and a cathode terminal is connected to the fifth capacitor.

Preferably, the switching power supply device is configured so that the first inductor is defined by a leakage inductance of the transformer.

Preferably, the switching power supply device is configured so that at least one of the first switch element, the second switch element, and the third switch element is defined by a field effect transistor.

Preferably, the switching power supply device further includes a first delay circuit defined by a series circuit including a resistor and a capacitor and that is connected between a control terminal of the first switch element and the first drive coil; a second delay circuit defined by a series circuit including a resistor and a capacitor and that is connected between a control terminal of the second switch element and the second drive coil; and a third delay circuit defined by a series circuit including a resistor and a capacitor and that is connected between a control terminal of the third switch element and the first drive coil, wherein the first, second, and third switching control circuits respectively turn on the first, second, and third switch elements after delaying voltages, which turn on the first, second, and third switch elements, by the first, second, and third delay circuits for predetermined periods of time since the voltages have been respectively generated at the first and second drive coils.

Preferably, the switching power supply device is configured such that the delayed periods of time of the first, second, and third delay circuits are respectively set so that drain-source voltages or collector-emitter voltages of the first switch element, the second switch element, and the third switch element decrease to zero voltage or a voltage near zero and then the first switch element, the second switch element, and the third switch element turn on.

Preferably, the switching power supply device is configured such that the first switching control circuit includes a first transistor and a first time-constant circuit, the second switching control circuit includes a second transistor and a second time-constant circuit, the third switching control circuit includes a third transistor and a third time-constant circuit, and the first transistor, the second transistor, or the third transistor turns on by a voltage generated at the first or second drive coil after a period of time set that is by the first time-constant circuit, the second time-constant circuit, or the third time-constant circuit, and the first switch element, the second switch element, or the third switch element turns off accordingly.

Preferably, the switching power supply device further includes a first feedback circuit that is provided downstream of the rectifying/smoothing circuit, wherein the feedback circuit monitors an output voltage that is output to the secondary side of the transformer through the rectifying/smoothing circuit, the feedback circuit includes an isolation element that allows a feedback signal to flow to the primary side in an electrically isolated manner when the output voltage exceeds a predetermined value, the feedback circuit immediately turns on the first transistor when receiving the feedback signal to cause the first switch element to turn off.

Preferably, the switching power supply device is configured such that the isolation element is a photocoupler.

Preferably, the switching power supply device further includes a second feedback circuit that monitors a voltage between both ends of the fifth capacitor, wherein the second feedback circuit immediately turns on the third transistor when the voltage between both ends of the fifth capacitor exceeds a predetermined value to cause the third switch element to turn off.

According to preferred embodiments of the present invention, the first switch element and the second switch element perform a zero voltage switching operation to greatly reduce a switching loss.

In addition, an input half-wave rectified voltage or a full-wave rectified voltage is switched by the third switch element to allow a current that is proportional to the rectified voltage to flow. Thus, the peak values of the current form a sinusoidal shape which provides a high power factor.

In addition, by driving the first switch element and the third switch element on a voltage from the same first drive coil, it is possible to separately control the on periods while achieving synchronization. Thus, even under a light load state or a no load state, it is possible to prevent an increase in switching frequency of the first switch element, and it is possible to prevent problems, such as noise due to intermittent oscillation and an increase in ripple voltage.

In addition, as the first switch element turns off, the third switch element synchronously turns off. Thus, the current peak value of the second inductor is limited by the maximum on period of the first switch element, and it is possible to prevent magnetic saturation of the second inductor.

According to preferred embodiments of the present invention, the first switch element and the second switch element perform a zero voltage switching operation to greatly reduce a switching loss.

In addition, an input half-wave rectified voltage or full-wave rectified voltage is switched by the third switch element to allow a current that is proportional to the rectified voltage to flow. Thus, the peak values of the current form a sinusoidal shape so as to provide a high power factor.

In addition, by driving the first switch element and the third switch element on a voltage from the same first drive coil, it is possible to separately control the on periods while achieving synchronization. Thus, even under a light load state or a no load state, it is possible to prevent an increase in switching frequency of the first switch element, and it is possible to prevent problems, such as noise due to intermittent oscillation and an increase in ripple voltage.

In addition, as the first switch element turns off, the third switch element synchronously turns off. Thus, the current peak value of the second inductor is limited by the maximum on period of the first switch element, and it is possible to prevent magnetic saturation of the second inductor.

In addition, in an on period of the first switch element, current flows through the series circuit including the primary coil of the transformer and the sixth capacitor. Thus, not only energy stored in the primary coil of the transformer but also electrostatic energy stored in the sixth capacitor may be transmitted to the secondary side, so it is possible to produce an even higher power converter.

According to preferred embodiments of the present invention, the first switch element and the second switch element perform a zero voltage switching operation to greatly reduce a switching loss.

In addition, an input half-wave rectified voltage or full-wave rectified voltage is switched by the third switch element to allow a current that is proportional to the rectified voltage to flow. Thus, the peak values of the current form a sinusoidal shape so as to provide a high power factor.

In addition, by driving the first switch element and the third switch element on a voltage from the same first drive coil, it is possible to separately control the on periods while achieving synchronization. Thus, even under a light load state or a no load state, it is possible to prevent an increase in switching frequency of the first switch element, and it is possible to prevent problems, such as noise due to intermittent oscillation and an increase in ripple voltage.

In addition, as the first switch element turns off, the third switch element synchronously turns off. Thus, the current peak value of the second inductor is limited by the maximum on period of the first switch element, and it is possible to prevent magnetic saturation of the second inductor.

In addition, in an on period of the first switch element, current flows through the series circuit of the primary coil of the transformer and the sixth capacitor. Thus, not only energy stored in the primary coil of the transformer but also electrostatic energy stored in the sixth capacitor may be transmitted to the secondary side, so it is possible to produce an even higher power converter.

Furthermore, the cathode of the fourth diode is preferably connected to the connecting point of the primary coil of the transformer and the sixth capacitor. Thus, a voltage applied between both ends of the fourth diode is relatively low. Therefore, it is possible to use a diode having a low withstanding voltage.

According to preferred embodiments of the present invention, the first switch element and the second switch element perform a zero voltage switching operation to greatly reduce a switching loss.

In addition, an input half-wave rectified voltage or full-wave rectified voltage is switched by the third switch element to flow a current that is proportional to the rectified voltage. Thus, the peak values of the current form a sinusoidal shape to give a high power factor.

In addition, by driving the first switch element and the third switch element on a voltage from the same first drive coil (Lb1), it is possible to separately control the on periods while achieving synchronization. Thus, even under a light load state or a no load state, it is possible to prevent an increase in switching frequency of the first switch element, and it is possible to prevent problems, such as noise due to intermittent oscillation and an increase in ripple voltage.

In addition, as the first switch element turns off, the third switch element synchronously turns off. Thus, the current peak value of the second inductor is limited by the maximum on period of the first switch element, and it is possible to prevent magnetic saturation of the second inductor (Li).

In addition, a voltage applied to the sixth capacitor increases. However, when it is assumed that the amount of charge stored is constant, the capacitance of the sixth capacitor may be reduced. Thus, it is possible to reduce the size of the sixth capacitor.

According to a preferred embodiment of the present invention, the fifth diode is connected between the input-side rectifier circuit and the fifth capacitor. Thus, the fifth capacitor may be directly charged at the time of start up, and it is possible to prevent bias magnetism, for example, of the transformer until the transformer reaches a steady state.

According to a preferred embodiment of the present invention, by using the leakage inductance of the transformer as the first inductor, it is possible to reduce the number of components.

According to a preferred embodiment of the present invention, at least one of the first switch circuit, the second switch circuit, and the third switch circuit is preferably defined by a field effect transistor. Thus, at least one of the first, second, and third diodes may be defined by a parasitic diode, and at least one of the first, second, and third capacitors may be defined by a parasitic capacitor. Therefore, the parallel-connected circuit of the first, second, and third switch elements, the first, second, and third diodes and the first, second, and third capacitors may be defined by a lesser number of components.

According to a preferred embodiment of the present invention, the first, second, and third delay circuits are provided, and the first, second, and third switch elements are turned on after delaying voltages, which turn on the first, second, and third switch elements, by the first, second, and third delay circuits for predetermined periods of time since the voltages have been respectively generated at the first and second drive coils. Thus, a dead time is provided, and it is possible to alternately turn on or off the first, second, and third switch elements at an appropriate timing.

According to a preferred embodiment of the present invention, the delayed periods of time of the first, second, and third delay circuits are respectively set so that voltages applied to both ends of the first, second, and third switch elements decrease to zero voltage or a voltage near zero and then the first, second, and third switch elements turn on. Thus, the first, second, and third switch elements perform a zero voltage switching operation to reduce a switching loss to thereby achieve high efficiency.

According to a preferred embodiment of the present invention, the first, second, and third switching control circuits are respectively defined by the first, second, and third transistors to define the first, second, and third time-constant circuits. Thus, it is easy to set the on periods of the first, second, and third switch elements.

According to a preferred embodiment of the present invention, the first switch element synchronizes a turn-on timing with the third switch element that functions as a switch element of a power-factor correcting circuit while independently performing on-period control. Thus, a ripple voltage is reduced, and an output voltage becomes stable.

According to a preferred embodiment of the present invention, the first feedback circuit monitors the output voltage generated at the secondary side of the transformer, and uses the photocoupler as the isolation element that feeds back the output voltage to the primary side. Thus, it is possible to save space.

According to a preferred embodiment of the present invention, the second feedback circuit monitors a voltage between both ends of the fifth capacitor, and, when Vi exceeds a predetermined value, turns on the fourth transistor to immediately turn on the third transistor to cause the third switch element to turn off. Thus, it is possible to limit the voltage between both ends of the fifth capacitor so as not to be above a predetermined value. Therefore, it is not necessary to use an expensive component having a high withstanding voltage.

Furthermore, the third switch element synchronizes a turn-on timing with the first switch element while independently performing on-period control. Thus, under a light load state or a no load state, the on period of the third switch element is shorter than the on period of the first switch element. Under a heavy load state, the on period of the third switch element may be varied equivalently or substantially equivalently to the on period of the first switch element at the maximum. Therefore, it is possible to optimally perform on-period control in response to a load.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
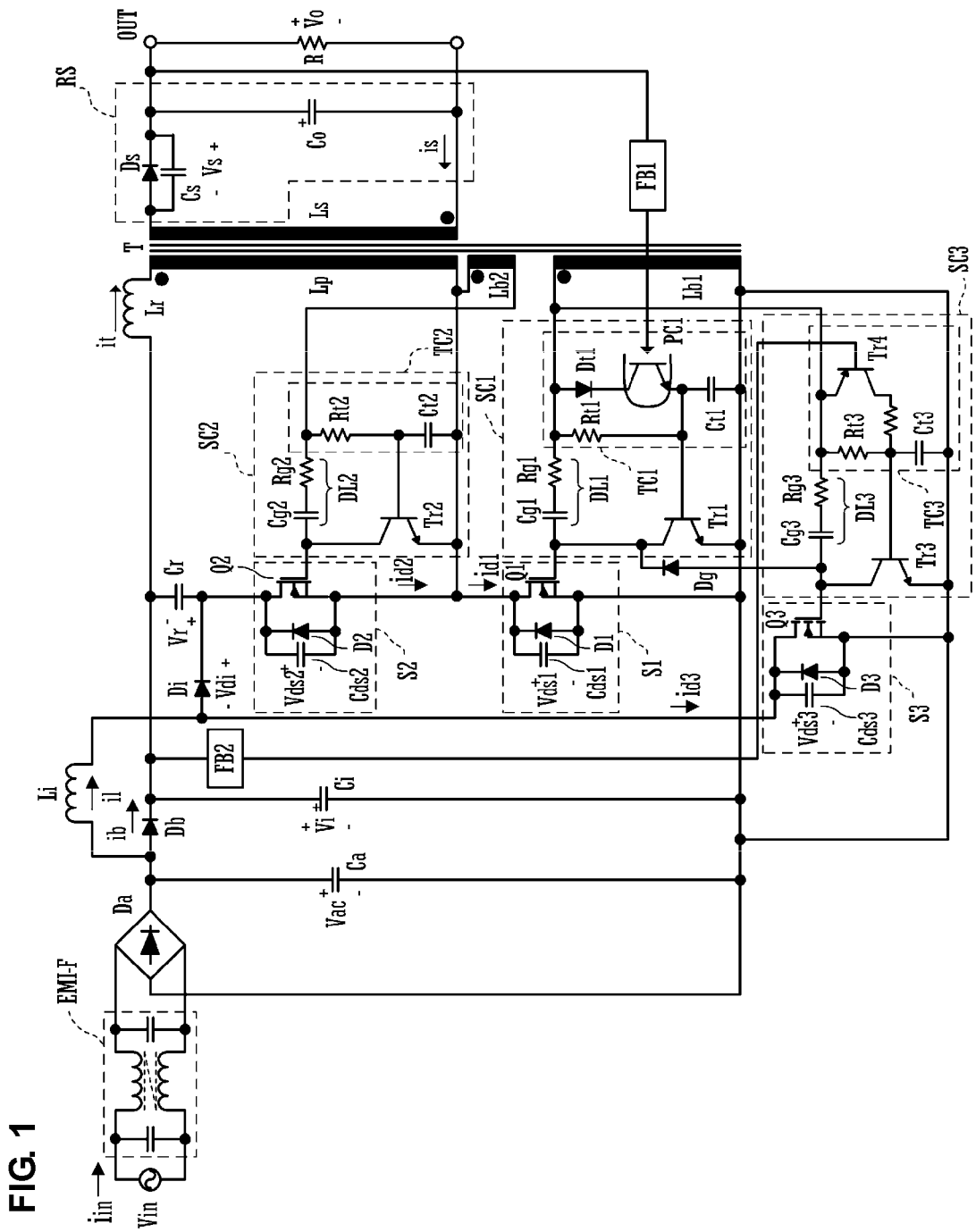
FIG. 1 is a circuit diagram of a switching power supply device according to a first preferred embodiment of the present invention.

A switching power supply device according to a first preferred embodiment of the present invention will be described with reference to FIG. 1. FIG. 1 is a circuit diagram of the switching power supply device. In FIG. 1, Vin is a commercial alternating-current power supply. An input-side rectifier circuit (Da) is defined by a diode bridge, and performs full-wave rectification over the commercial alternating-current power supply (Vin) through an EMI filter (EMI-F). A first switch circuit (S1) includes a first switch element (Q1), a first diode (D1), and a first capacitor (Cds1). Similarly, a second switch circuit (S2) includes a second switch element (Q2), a second diode (D2), and a second capacitor (Cds2), and a third switch circuit (S3) includes a third switch element (Q3), a third diode (D3), and a third capacitor (Cds3). The first to third diodes (D1, D2 and D3) are parasitic diodes of the first to third switch elements (Q1, Q2 and Q3), which are preferably FETs. The first to third capacitors (Cds1, Cds2 and Cds3) are parasitic capacitors of the first to third switch elements (Q1, Q2 and Q3) However, in order to obtain a necessary characteristic, D1, D2, D3, Cds1, Cds2 and Cds3 may alternatively be included separately from Q1, Q2 and Q3, for example.

A rectified voltage of the input-side rectifier circuit (Da) is applied to a fourth capacitor (Ca). A transformer (T) includes a primary coil (Lp), a secondary coil (Ls), a first drive coil (Lb1), and a second drive coil (Lb2). A rectifying/smoothing circuit (RS) defined by a rectifier diode (Ds) and a smoothing capacitor (Co) is connected to the secondary coil (Ls) of the transformer (T). A capacitor (Cs) for resonating when a voltage of the transformer (T) is inverted is connected in parallel with the rectifier diode (Ds). The capacitor (Cs) may preferably be defined by a parasitic capacitance of the rectifier diode (Ds). In addition, a first inductor (Lr) is connected in series with the primary coil (Lp) of the transformer (T). The first inductor (Lr) may preferably be defined by a leakage inductance of the transformer (T). One end of a second inductor (Li) is connected in series with the third switch circuit (S3), and the other end of the second inductor (Li) is connected to an output of the input-side rectifier circuit (Da).

A sixth capacitor (Cr) is connected in series with the second switch circuit (S2). The second switch circuit (S2), the sixth capacitor (Cr), the first inductor (Lr), and the primary coil (Lp) of the transformer (T) define a closed loop. In addition, in order to block a backward current from flowing through the second inductor (Li), a fourth diode (Di) is inserted. The anode of the fourth diode (Di) is connected to one end of the second inductor (Li), and the cathode of the fourth diode (Di) is connected to one end of the second switch element (Q2).

A fifth capacitor (Ci) is connected between one end of the first inductor (Lr) and a connecting point of the first switch circuit (S1) and the fourth capacitor (Ca).

First to third switching control circuits (SC1, SC2 and SC3) are respectively connected to the first to third switch circuits (S1, S2 and S3). A fifth diode (Db) is connected between the input-side rectifier circuit (Da) and the fifth capacitor (Ci).

The first switching control circuit (SC1) includes a first transistor (Tr1), a first delay circuit (DL1), and a first time-constant circuit (TC1) that are connected between the gate and source of the first switch element (Q1). The first delay circuit (DL1) is defined by a series circuit including a capacitor (Cg1) and a resistor (Rg1) and an input capacitance (not shown) of the switch element (Q1). The first switch element (Q1) turns on by a voltage induced by the first drive coil (Lb1), and a turn-on timing of the first switch element (Q1) is delayed by the first delay circuit (DL1).

The first time-constant circuit (TC1) includes a capacitor (Ct1) and an impedance circuit defined by a resistor (Rt1), a diode (Dt1), and a phototransistor of a photocoupler (PC1). The first time-constant circuit (TC1) and the first transistor (Tr1) perform turn-off control over the first switch element (Q1).

Each of the second switching control circuit (SC2) and the third switching control circuit (SC3) also have a similar configuration to that of the first switching control circuit (SC1), and operate similarly.

A first feedback circuit (FB1) is connected to the phototransistor of the photocoupler (PC1) of the first switching control circuit (SC1). The first feedback circuit (FB1) detects an output voltage (Vo) output from the rectifying/smoothing circuit (RS) to an output terminal (OUT), and performs feedback control such that the output voltage (Vo) is stable. A second feedback circuit (FB2) detects a voltage (Vi) between both ends of the fifth capacitor (Ci), and performs feedback control such that the on period of the third switch element (Q3) is controlled so that the voltage (Vi) between both ends does not increase beyond a predetermined value under a light load.

The fourth capacitor (Ca) prevents propagation of high-frequency current, caused by switching of the first switch element (Q1) and switching of the second switch element (Q2), to an input power supply line side to thereby reduce noise. In addition, an inductor, for example, may preferably be inserted, and a low-pass filter is defined by the inductance and the capacitance of the fourth capacitor (Ca).

Figure 10:
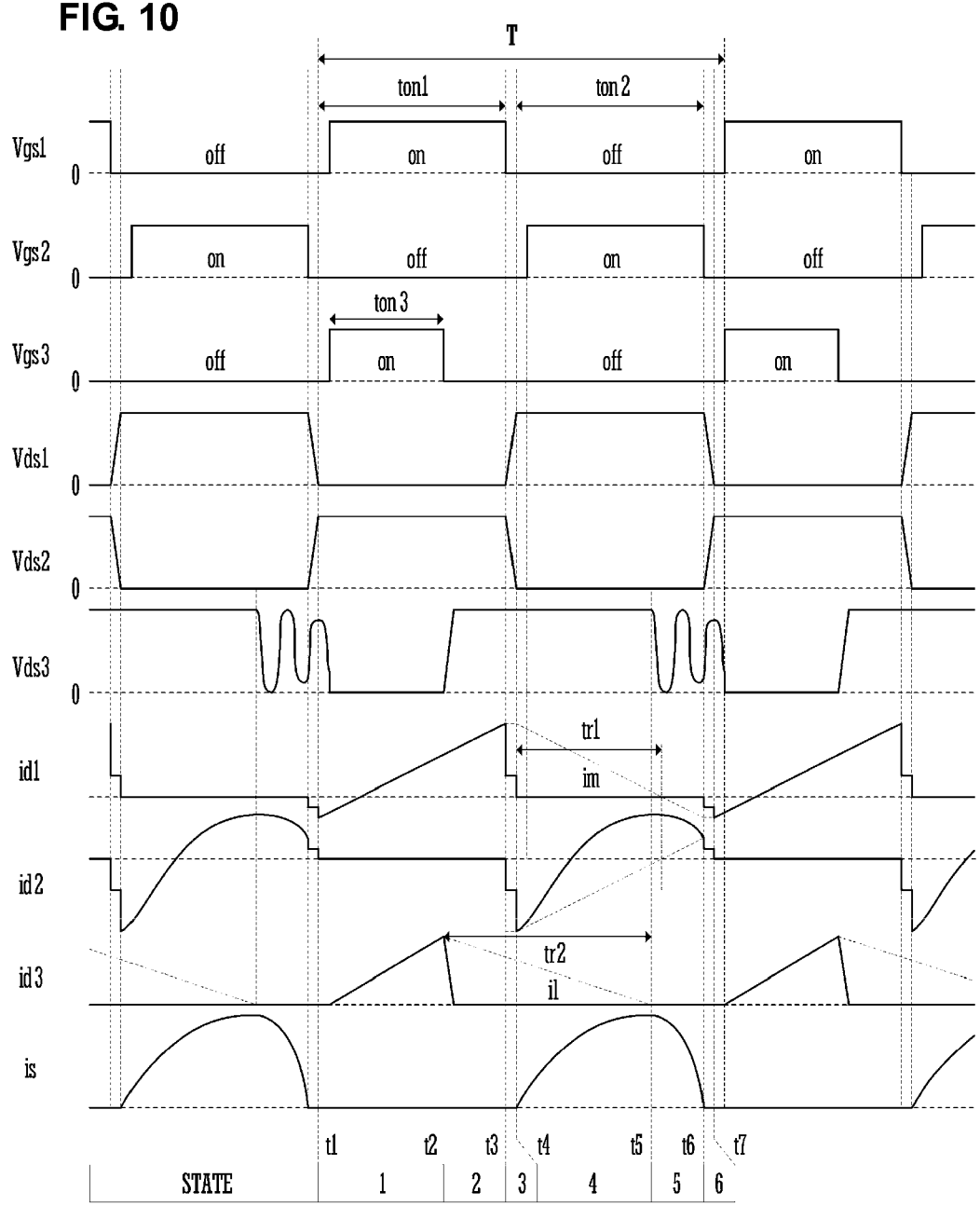
FIG. 10 is a voltage/current waveform chart of each element of the switching power supply device according to the first preferred embodiment of the present invention.
Figure 11:
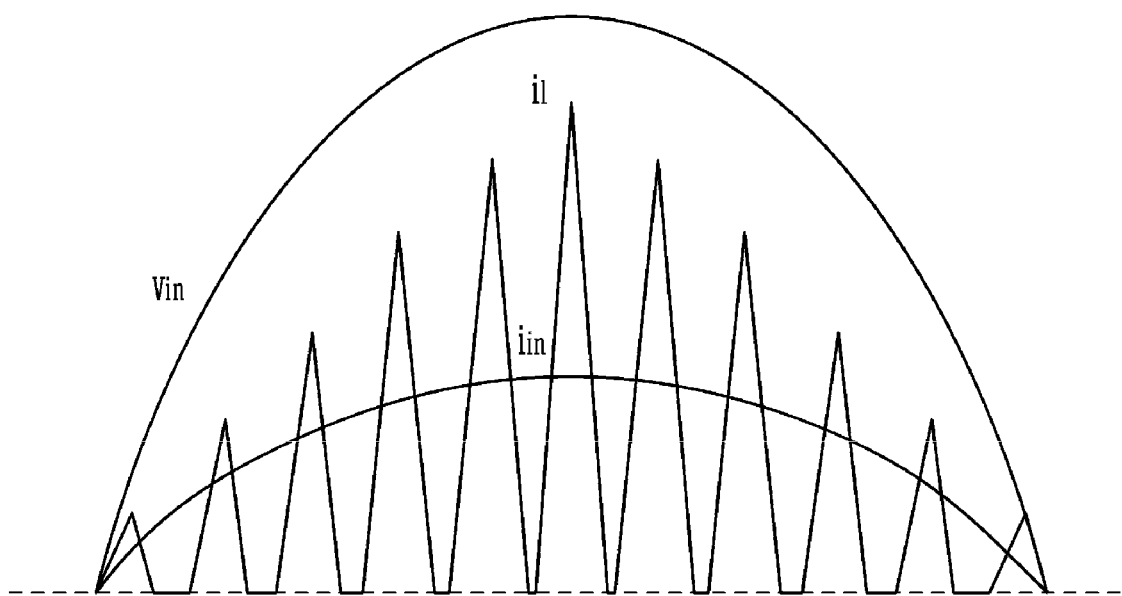
FIG. 11 is a correlation waveform chart of an input voltage, an input current and a current that flows through a second inductor (Li) in the switching power supply device according to the first preferred embodiment of the present invention.
Figure 12:
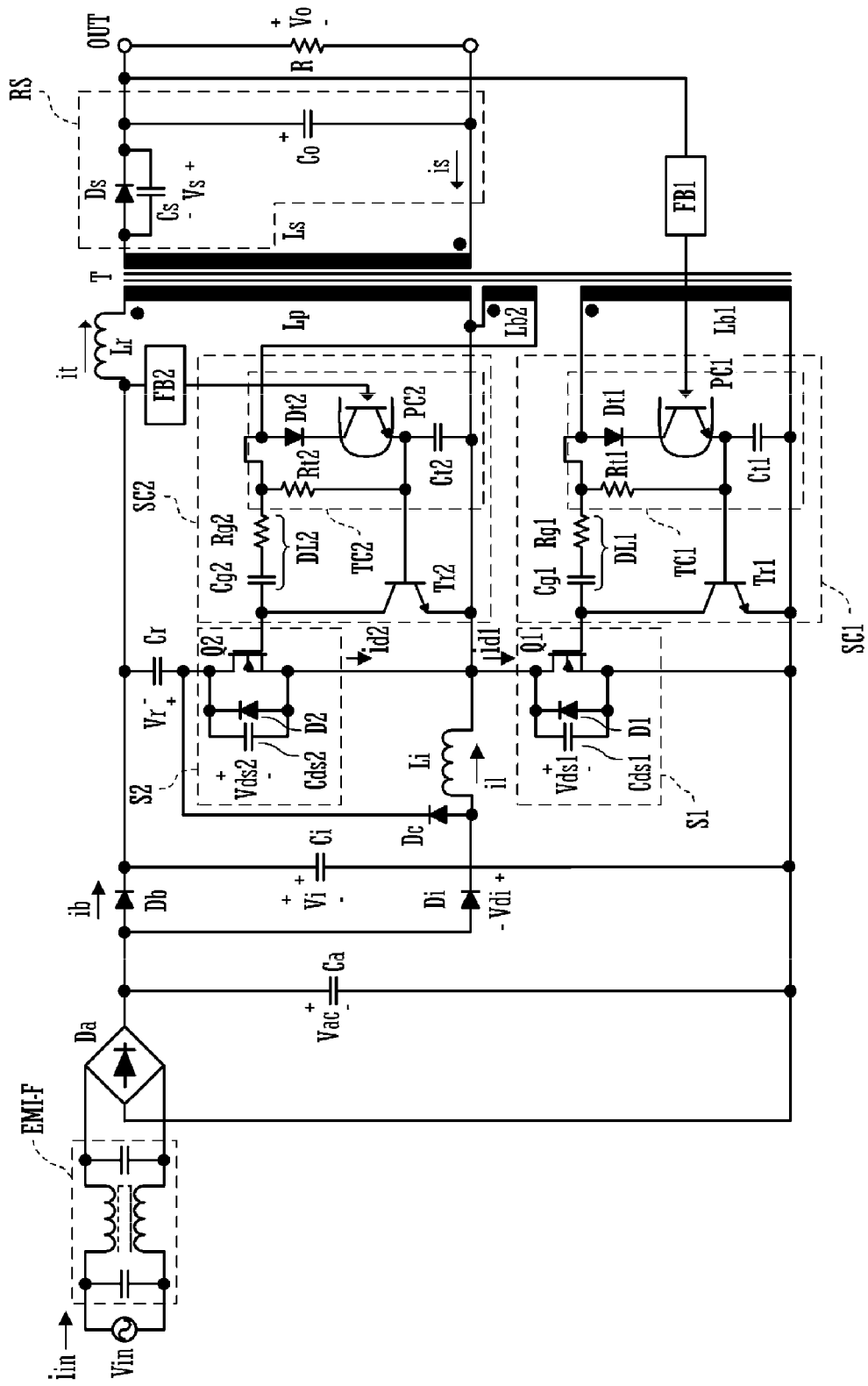
FIG. 12 is a circuit diagram of an existing switching power supply device described in International Patent Application Publication No. WO2005/074113.
Figure 13:
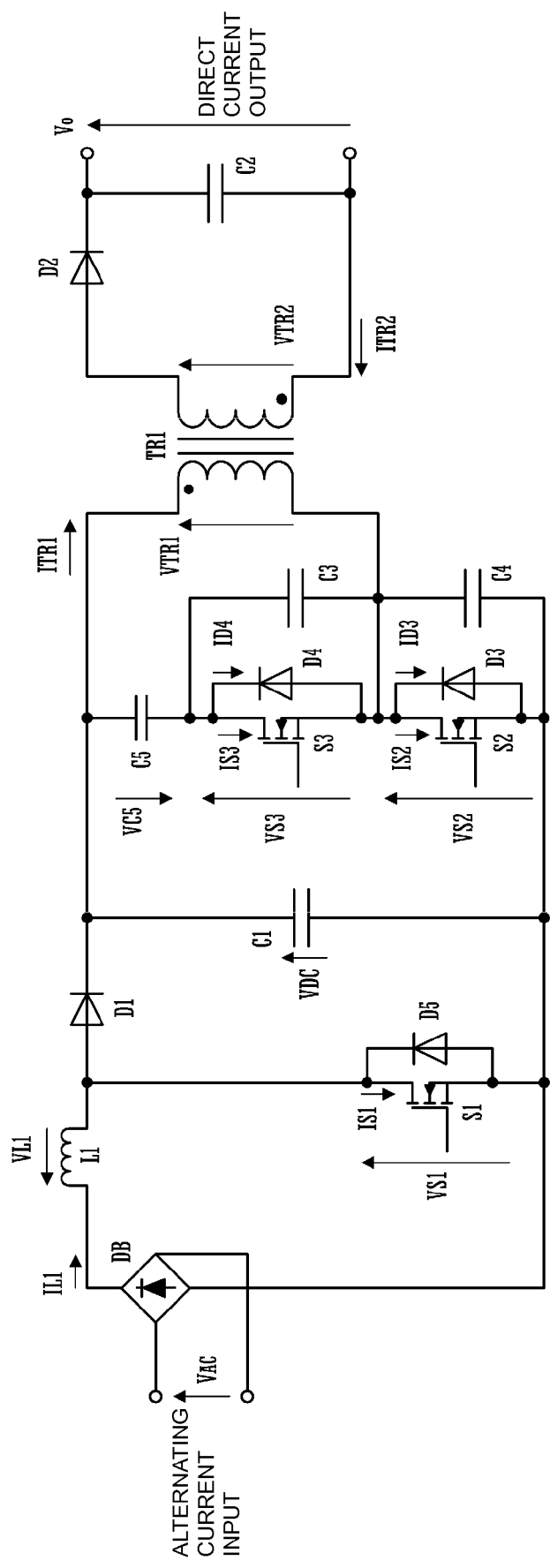
FIG. 13 is a circuit diagram of an existing switching power supply device described in Japanese Unexamined Patent Application Publication No. 2000-116126.

Next, the circuit operations of the switching power supply device shown in FIG. 1 will be described with reference to FIG. 10 and FIG. 11. FIG. 10 is a waveform chart of each component shown in FIG. 1. In addition, FIG. 11 is a schematic waveform chart of an input voltage Vin and input current iin of a commercial power supply and a current il that flows through the inductor Li. Where on/off signals (gate-source voltages) of the first to third switch elements (Q1, Q2 and Q3) are Vgs1, Vgs2 and Vgs3, drain-source voltages thereof are Vds1, Vds2 and Vds3, drain currents thereof are id1, id2 and id3, and a current of the rectifier diode (Ds) is is, the operations of respective states are shown below.

(1) State 1 [t1 to t2]

The first diode (D1) or the first switch element (Q1) is conducting, and the first switch element (Q1) turns on by a voltage of the first drive coil (Lb1) while the first diode (D1) is conducting, thus performing a ZVS (zero voltage switching) operation. The input voltage (Vi) is applied to the primary coil (Lp) of the transformer (T) to excite the primary coil (Lp). A full-wave rectification voltage (Vac) is applied to the second inductor (Li). The third switch element (Q3) also turns on in synchronization with the first switch element (Q1), and turns on in the vicinity of a zero voltage by the third delay circuit (DL3). The second feedback circuit (FB2) is monitoring the voltage (Vi) between both ends of the fifth capacitor (C1). When Vi increases beyond a predetermined value, the second feedback circuit (FB2) turns on the fourth transistor (Tr4) inside the third switching control circuit (SC3), the capacitor (Ct3) is charged to attain a threshold voltage of the third transistor (tr3) to turn on the third transistor (Tr3), and then the third switch element (Q3) turns off to invert the voltage of the second inductor (Li).

(2) State 2 [t2 to t3]

At time t2, the third switch element (Q3) turns off, and the first switch element (Q1) is continuously turned on. At time t3, the voltage of the capacitor (Ct1) reaches the threshold value of the first transistor (Tr1) to turn on the first transistor (Tr1), and the first switch element (Q1) turns off to invert the voltage (voltage of each coil of the transformer T) of the transformer (T).

(3) State 3 [t3 to t4]

The first capacitor (Cds1) is charged by current that flows through the primary coil (Lp) of the transformer (T) and the first inductor (Lr), and the second capacitor (Cds2) is discharged. At time t4, the drain-source voltage (Vds2) of the second switch element (Q2) becomes a zero voltage to cause the second diode (D2) to be in a conductive state. At the secondary side of the transformer (T), as the voltage (Vs) approaches zero, the rectifier diode (Ds) enters a conductive state.

(4) State 4 [t4 to t5]

At the time when the second diode (D2) enters a conductive state, the second switch element (Q2) turns on by the voltage of the second drive coil (Lb2) to perform a ZVS operation. At the primary side of the transformer (T), the first inductor (Lr) resonates with the sixth capacitor (Cr), and the fifth capacitor (Ci) is charged by an exciting current stored in the second inductor (Li). At the secondary side of the transformer (T), exciting energy of the transformer (T) is released from the secondary coil (Ls), and a current (is) that flows through the diode (Ds) forms a curved waveform. In FIG. 10, tr1 is a reset time of the transformer (T). As the current (il) reaches zero at time t5 (after a lapse of tr2 from t2), charging of the fifth capacitor (Ci) ceases.

(5) State 5 [t5 to t6]

As the current (i1) reaches zero, the drain-source voltage (Vds3) of the third switch element (Q3) oscillates because of the second inductor (Li) and the third capacitor (Cds3).

In State 4 and State 5, the voltage (Vr) of the sixth capacitor (Cr) is applied to the series circuit of the primary coil (Lp) of the transformer (T) and the first inductor (Lr), and the exciting current (im) linearly or substantially linearly reduces. As the exciting current (im) reaches zero, it becomes a negative current and excites the primary coil (Lp) of the transformer (T) in a direction opposite to State 1. At the secondary side, the current (is) flows until it reaches zero. As the voltage of the capacitor (Ct2) reaches a threshold voltage of the second transistor (Tr2) at time t6 and then the second transistor (Tr2) turns on, the second switch element (Q2) turns off.

(6) State 6 [t6 to t7]

At the secondary side of the transformer (T), an inverse voltage is applied to the diode (Ds) to invert the voltage of the secondary coil (Ls) of the transformer (T). At the primary side, due to the current that flows through the primary coil (Lp) and the first inductor (Lr), the first capacitor (Cds1) is discharged and the second capacitor (Cds2) is charged. As the voltage (Vds1) between the drain and source of the first switch element (Q1) reaches zero at time t7, the first diode (D1) enters a conductive state.

The above States 1 to 6 are repeated.

Figure 9A:
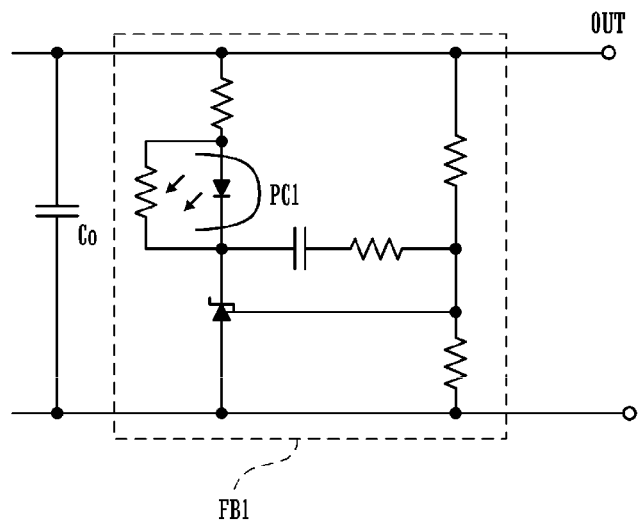
FIG. 9A is a circuit diagram showing a preferred embodiment of a first feedback circuit of the present invention.

Note that a typical circuit configuration of the first feedback circuit (FB1) is shown in FIG. 9A. The voltage (Vo) output to the output terminal (OUT) is divided by a voltage-dividing resistor, and a shunt regulator (no reference sign) is provided so that the photodiode of the photocoupler (PC1) emits light only when the divided voltage value exceeds a predetermined reference value.

Figure 9B:
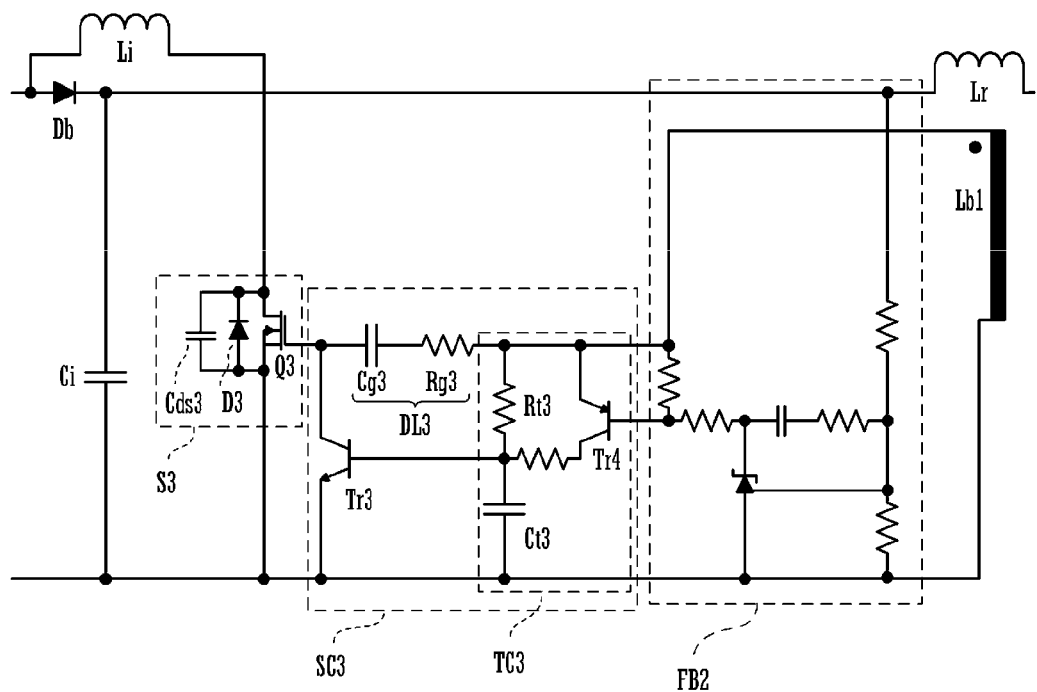
FIG. 9B is a circuit diagram showing a preferred embodiment of a second feedback circuit of the present invention.

In addition, a typical circuit configuration of the second feedback circuit (FB2) is shown in FIG. 9B. The voltage (Vi) between both ends of the fifth capacitor (Ci) is divided by a voltage-dividing resistor, and, only when the divided voltage value exceeds a predetermined reference value, a shunt regulator (no reference sign) is activated to turn on the fourth transistor. With the above-described operation, eventually, the third switch element (Q3) immediately turns off to suppress an increase in voltage (Vi) between both ends of the fifth capacitor (Ci).

The advantages of the switching power supply device shown in FIG. 1 are summarized as follows.

The first and second switch elements (Q1 and Q2) perform a ZVS operation, and the third switch element (Q3) turns on in the vicinity of zero voltage by the third delay circuit (DL3), such that a switching loss is greatly reduced.

As a switching current flows through the fourth diode (Di), and then the switching current flows through the fourth capacitor (Ca), no switching current flows through the input-side rectifier circuit (Da). Thus, it is possible to reduce a loss. In addition, the fourth diode (Di) is required to operate at a high speed corresponding to a switching frequency. However, a typical diode that operates at a low speed corresponding to the frequency of the commercial power supply may preferably be used for the input-side rectifier circuit (Da) and the fifth diode (Db).

The output voltage (Vo) is controlled to be stable by controlling the on period of the first switch element (Q1) based on a signal of the first feedback circuit (FB1).

The input voltage (Vi) is controlled by controlling the on period of the third switch element (Q3) based on a signal of the second feedback circuit (FB2). Thus, it is possible to suppress an increase in the voltage (Vi) between both ends of the fifth capacitor (Ci) under a light load state or a no load state.

Figure 2:
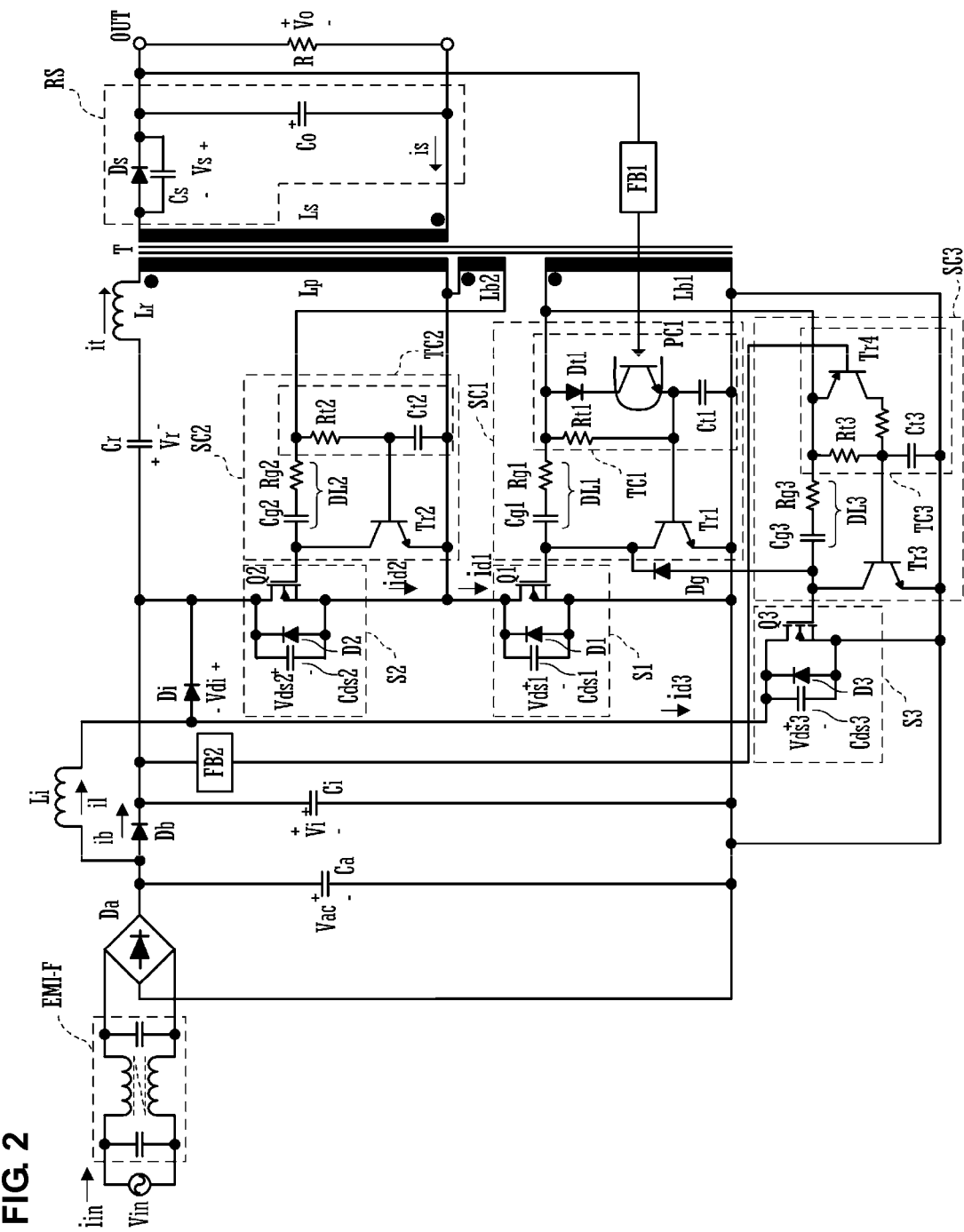
FIG. 2 is a circuit diagram of a switching power supply device according to a second preferred embodiment of the present invention.

Next, a switching power supply device according to a second preferred embodiment of the present invention will be described with reference to FIG. 2. FIG. 2 is a circuit diagram of the switching power supply device. The switching power supply device shown in FIG. 2 is different from the configuration shown in FIG. 1, in that the sixth capacitor (Cr) is connected between one end of the fifth capacitor (Ci) and the first inductor (Lr). The remaining configuration is similar to that shown in FIG. 1.

With the configuration shown in FIG. 2, the same or substantially the same advantages as those of the first preferred embodiment are obtained. In addition, because one end of the second switch element (Q2) is connected to a connecting point of the fifth capacitor (Ci) and the sixth capacitor (Cr) that is connected in series with the first inductor (Lr), it is possible to decrease voltages applied to the first and second switch elements (Q1 and Q2). Thus, voltage stresses of the first and second switch elements (Q1 and Q2) are reduced.

Figure 3:
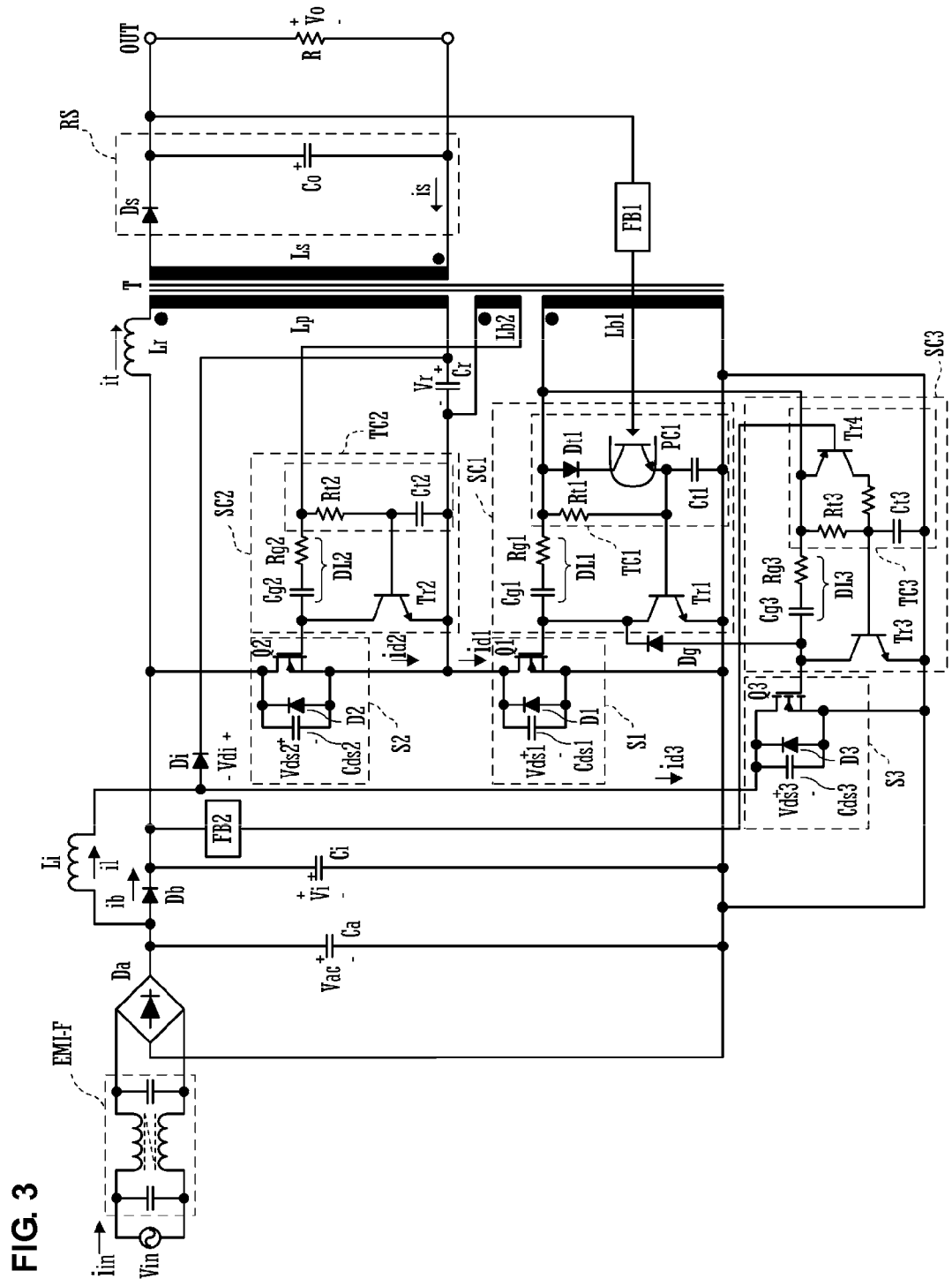
FIG. 3 is a circuit diagram of a switching power supply device according to a third preferred embodiment of the present invention.

Next, a switching power supply device according to a third preferred embodiment of the present invention will be described with reference to FIG. 3. FIG. 3 is a circuit diagram of the switching power supply device. The switching power supply device shown in FIG. 3 is different from the configuration shown in FIG. 1, in that the sixth capacitor (Cr) is connected between the cathode of the fourth diode (Di) and a connecting point of the first switch element (Q1) and the second switch element (Q2) The other configuration is similar to that shown in FIG. 1.

With the configuration shown in FIG. 3, the same or substantially the same advantages as those of the first preferred embodiment are obtained. In addition, when the third switch element (Q3) turns off, an exciting current stored in the second inductor (Li) charges the fifth capacitor (Ci) through a route of the fourth diode (Di), the sixth capacitor (Cr), the second switch element (Q2), and the fifth capacitor (Ci). Thus, the operation is similar to that of the first preferred embodiment. In addition, while the first switch element (Q1) is on, the sixth capacitor (Cr) is connected in series with the primary coil (Lp) of the transformer (T), so it is possible to construct a converter that is able to output even higher power.

Figure 4:
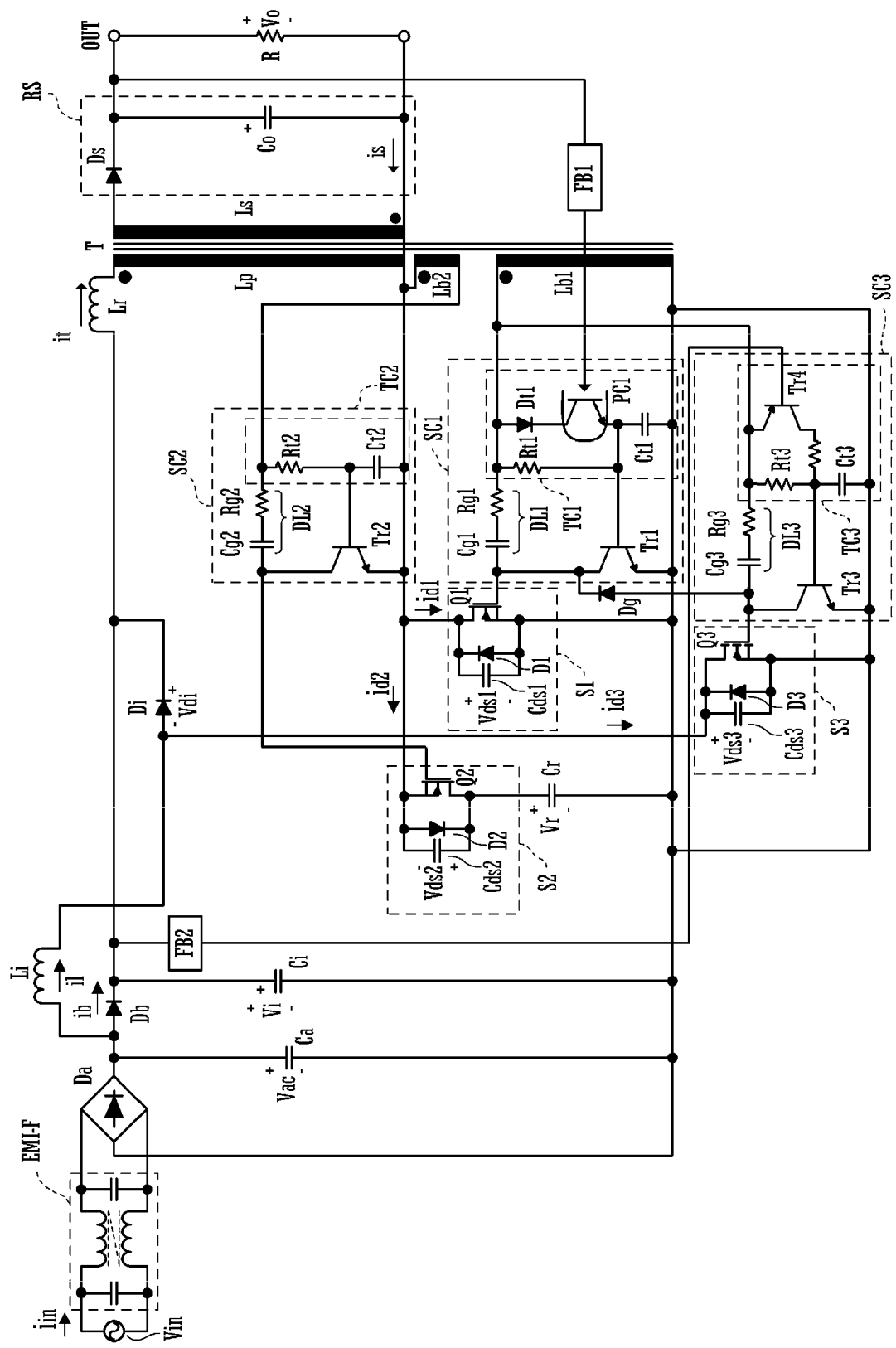
FIG. 4 is a circuit diagram of a switching power supply device according to a fourth preferred embodiment of the present invention.

Next, a switching power supply device according to a fourth preferred embodiment of the present invention will be described with reference to FIG. 4. FIG. 4 is a circuit diagram of the switching power supply device. The switching power supply device shown in FIG. 4 is different from the switching power supply device shown in FIG. 1, in that the series circuit of the second switch circuit (S2) and the sixth capacitor (Cr) is connected in parallel with the first switch circuit (S1). The remaining configuration is similar to that shown in FIG. 1.

With the circuit configuration shown in FIG. 4, advantages similar to those of the first preferred embodiment are obtained. In addition, a voltage applied to the sixth capacitor (Cr) increases. However, when it is assumed that the amount of charge stored is constant, the capacitance of the sixth capacitor (Cr) may be reduced. Thus, it is possible to reduce the size of the sixth capacitor (Cr).

Figure 5:
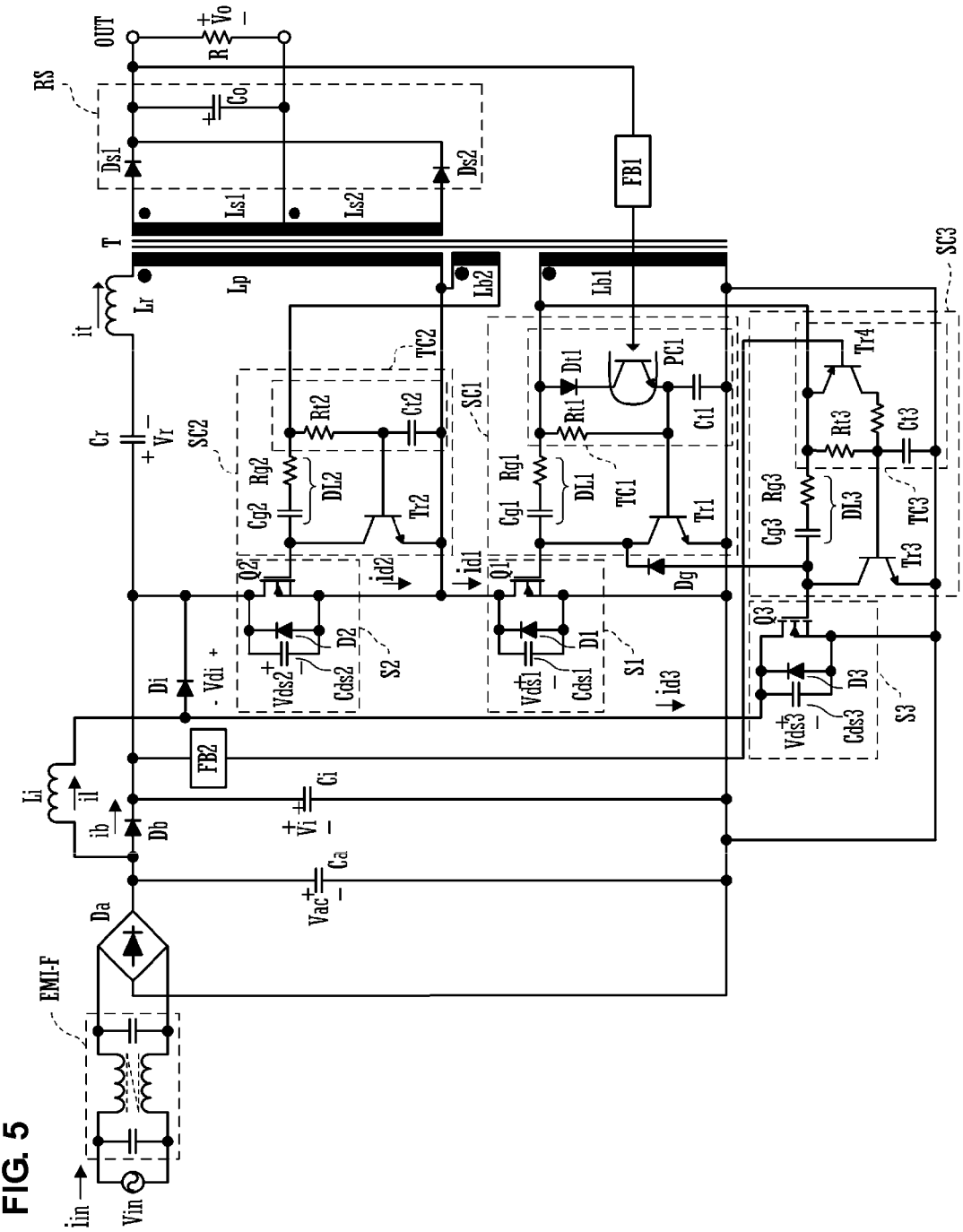
FIG. 5 is a circuit diagram of a switching power supply device according to a fifth preferred embodiment of the present invention.

Next, a switching power supply device according to a fifth preferred embodiment of the present invention will be described with reference to FIG. 5. FIG. 5 is a circuit diagram of the switching power supply device. In this preferred embodiment, a circuit configuration at the primary side is substantially the same as that of the second preferred embodiment shown in FIG. 2. The difference is that the transformer (T) is a center tap type transformer in which the secondary coil (Ls) is defined by two coils (Ls1 and Ls2), and the secondary-side rectifying/smoothing circuit (RS) is a full-wave rectifying circuit.

With the circuit configuration shown in FIG. 5, advantages similar to those of the first preferred embodiment are obtained. In addition, the current waveforms of the first and second switch elements (Q1 and Q2) are sinusoidal, such that the peak of a current at the time of turn off is small and, therefore, a switching loss is small. Furthermore, because energy is stored in the series circuit of the first inductor (Lr) and the sixth capacitor (Cr), a load on the transformer (T) is reduced.

Next, a switching power supply device according to a sixth preferred embodiment of the present invention will be described with reference to FIG. 6.

Figure 6:
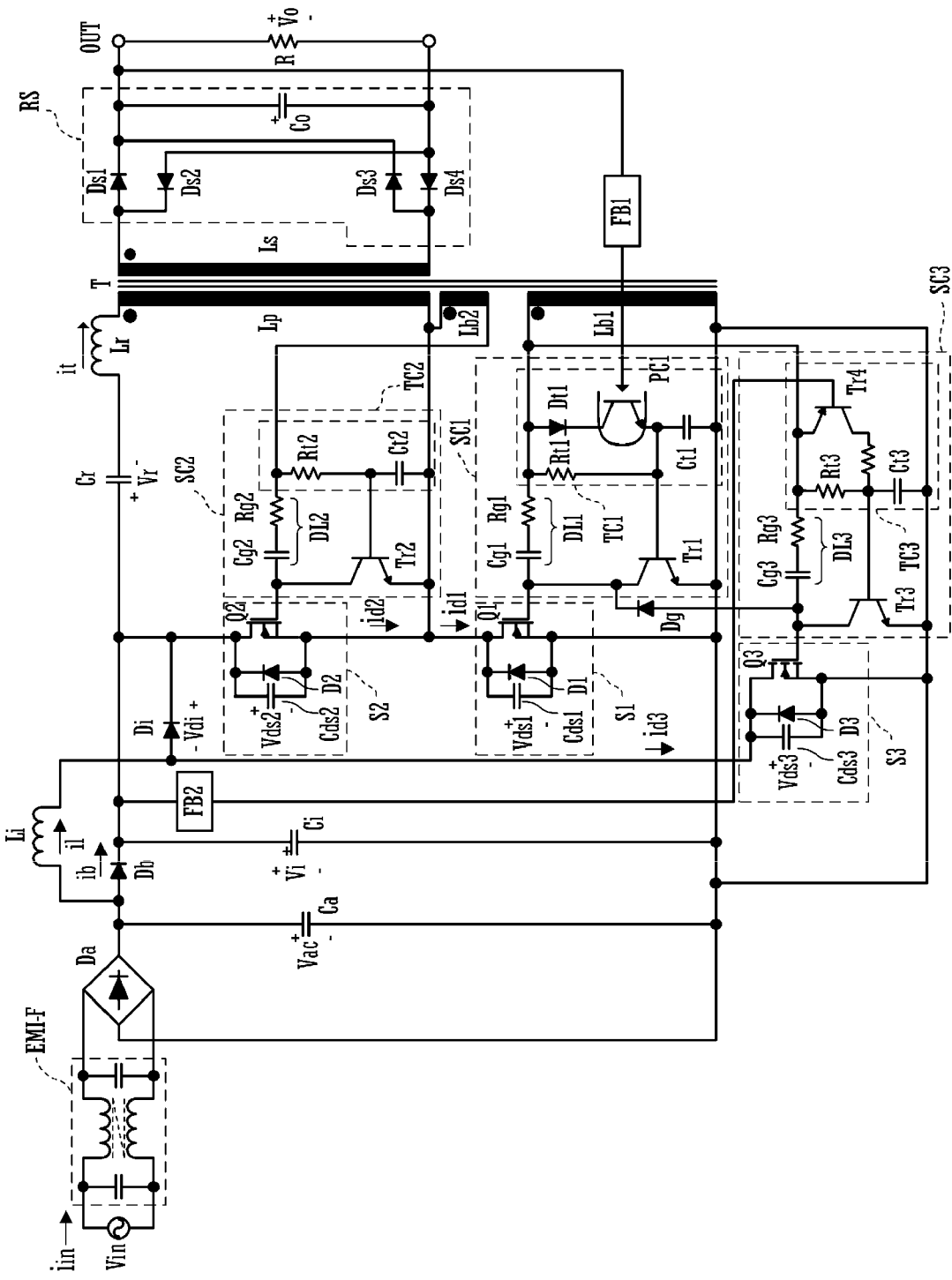
FIG. 6 is a circuit diagram of a switching power supply device according to a sixth preferred embodiment of the present invention.

FIG. 6 is a circuit diagram of the switching power supply device. In this preferred embodiment, a circuit configuration at the primary side is substantially the same as that of the second preferred embodiment shown in FIG. 2. The difference is that the rectifying/smoothing circuit (RS) at the secondary side of the transformer (T) is a full-wave rectifying circuit defined by a diode bridge including Ds1 to Ds4. With the circuit configuration shown in FIG. 6, advantages similar to those of the first and fifth preferred embodiments are obtained. In addition, it is possible to decrease voltages applied to the diodes (Ds1 to Ds4), such that an element having a low withstanding voltage may be used.

Figure 7:
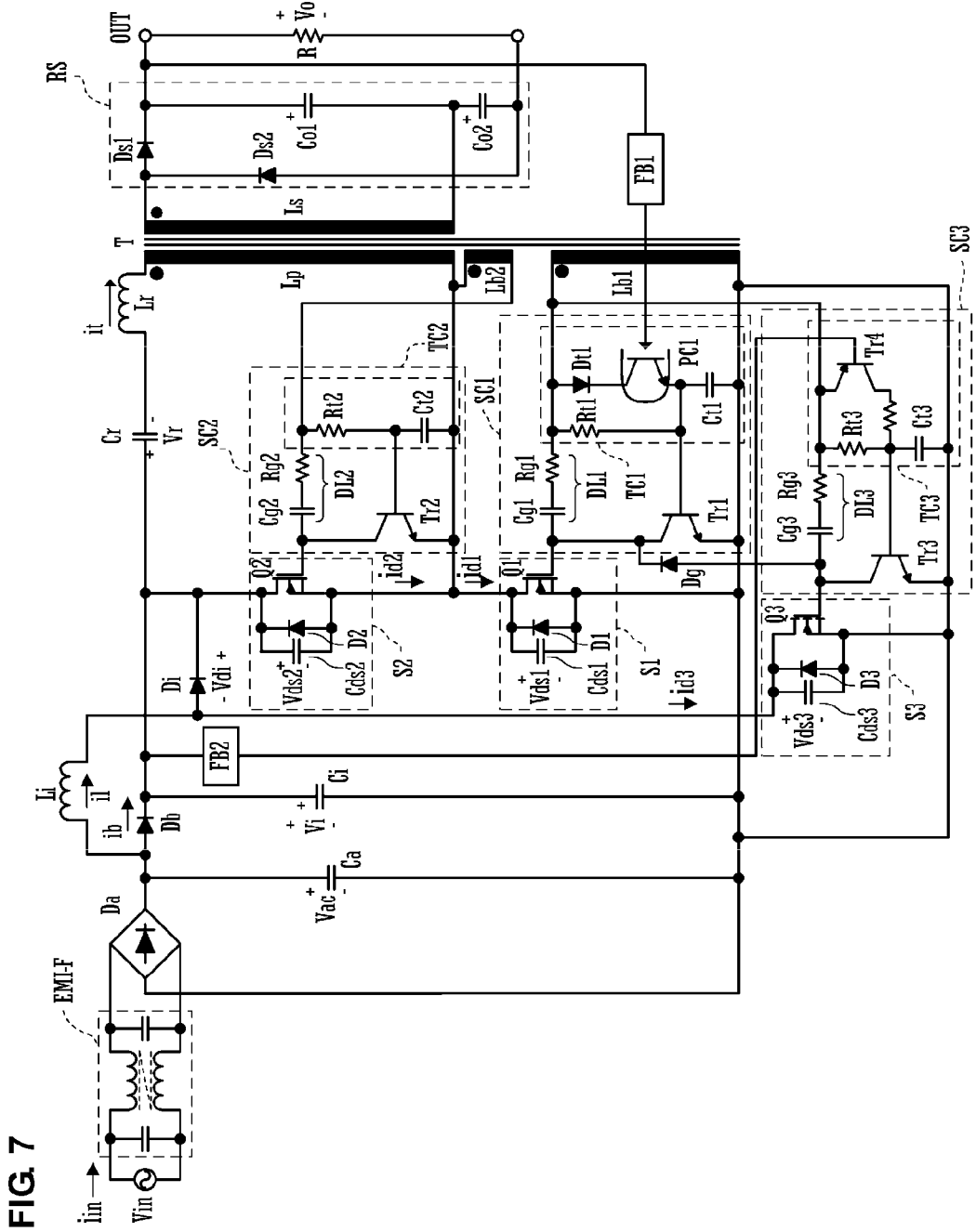
FIG. 7 is a circuit diagram of a switching power supply device according to a seventh preferred embodiment of the present invention.

Next, a switching power supply device according to a seventh preferred embodiment of the present invention will be described with reference to FIG. 7. FIG. 7 is a circuit diagram of the switching power supply device. In this preferred embodiment, a circuit configuration at the primary side is substantially the same as that of the second preferred embodiment shown in FIG. 2. The difference is that the rectifying/smoothing circuit (RS) at the secondary side of the transformer (T) is a voltage-doubler circuit.

With the circuit configuration shown in FIG. 7, advantages similar to those of the first, fifth, and sixth preferred embodiments are obtained. In addition, the number of turns of the secondary coil (Ls) of the transformer (T) may be reduced.

Figure 8:
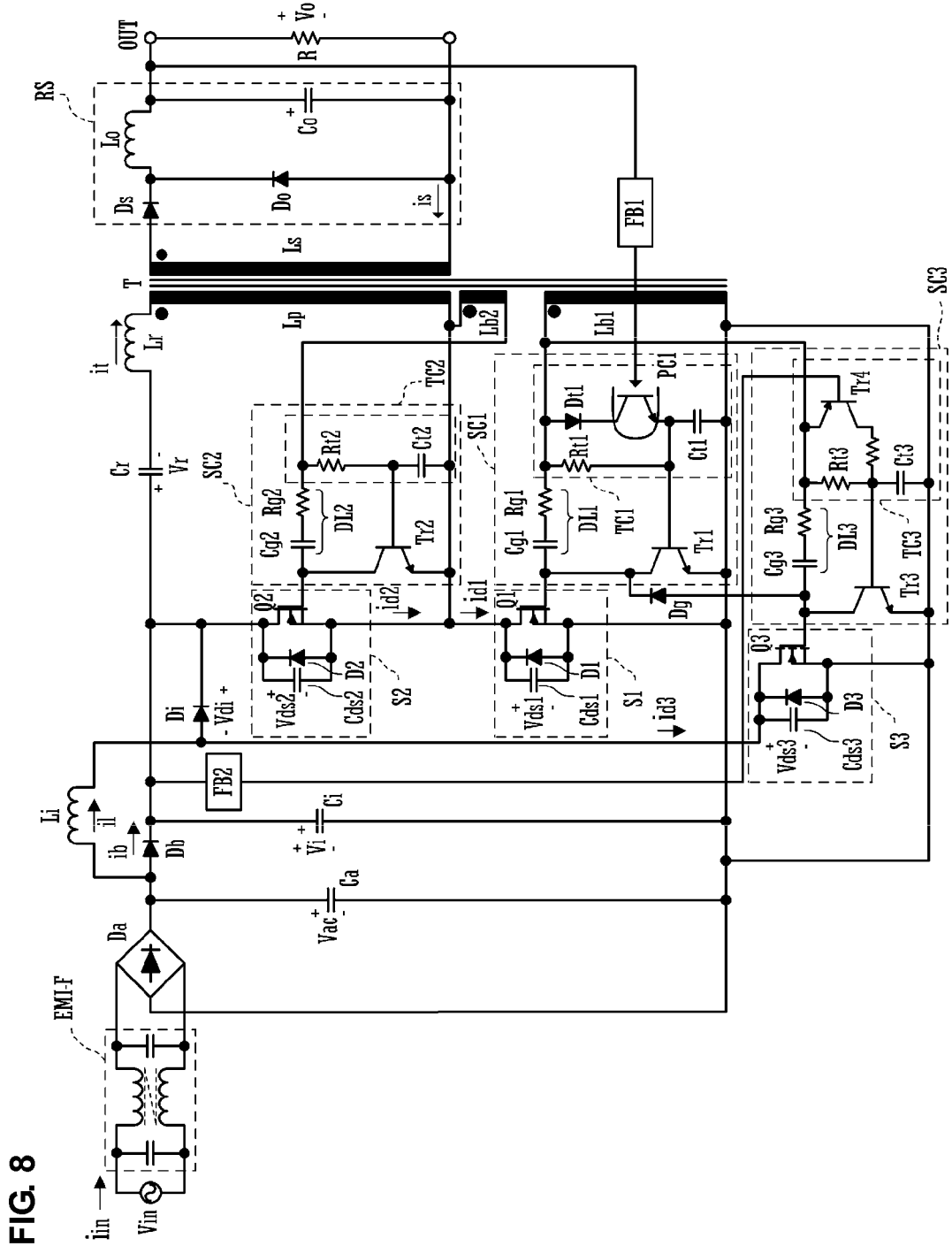
FIG. 8 is a circuit diagram of a switching power supply device according to an eighth preferred embodiment of the present invention.

Next, a switching power supply device according to an eighth embodiment of the present invention will be described with reference to FIG. 8. FIG. 8 is a circuit diagram of the switching power supply device. In this preferred embodiment, a circuit configuration at the primary side is substantially the same as that of the second preferred embodiment shown in FIG. 2. The difference is that the rectifying/smoothing circuit (RS) at the secondary side of the transformer (T) is defined by a rectifying diode (Ds), a freewheel diode (Do), an inductor (Lo), and a smoothing capacitor (Co), and a forward converter type is used.

With the circuit configuration shown in FIG. 8, advantages similar to those of the first preferred embodiment are obtained. In addition, because exciting energy is stored in the inductor (Lo), the size of the transformer (T) may be reduced.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A switching power supply device comprising:
a first switch circuit defined by a parallel-connected circuit including a first switch element, a first diode, and a first capacitor;
a second switch circuit defined by a parallel-connected circuit including a second switch element, a second diode, and a second capacitor;
a third switch circuit defined by a parallel-connected circuit including a third switch element, a third diode, and a third capacitor;
an input-side rectifier circuit including at least one rectifying element arranged to rectify an alternating input voltage;
a fourth capacitor, to which a voltage rectified by the input-side rectifier circuit is applied;
a transformer including at least a primary coil, a secondary coil, a first drive coil, and a second drive coil;
a rectifying/smoothing circuit connected to the secondary coil;
a first inductor connected in series with the primary coil;
a second inductor connected such that a voltage of the fourth capacitor is applied to the second inductor during an on period of the third switch circuit that operates such that the on period of the third switch circuit is included in an on period of the first switch circuit;
a fourth diode including an anode connected to one end of the second inductor and a cathode connected to one end of the second switch element so as to prevent a backward current from flowing to the second inductor;
a fifth capacitor connected such that the fifth capacitor is charged with exciting energy stored in the second inductor and applies a voltage to a series circuit defined by the primary coil and the first inductor, during an on period of the first switch circuit;
a sixth capacitor connected in parallel with the primary coil of the transformer and defining a series circuit including the second switch circuit;
a first switching control circuit and a second switching control circuit arranged to alternately turn on or off the first and second switch elements with an intervening period during which both the first and second switch elements turn off; and
a third switching control circuit arranged to turn on or off the third switch element; wherein
each of the first switching control circuit and the third switching control circuit operates on a voltage generated at the first drive coil, and the second switching control circuit operates on a voltage generated at the second drive coil.

2. The switching power supply device according to claim 1, further comprising a fifth diode including an anode terminal connected to the input-side rectifier circuit and a cathode terminal connected to the fifth capacitor.

3. The switching power supply device according to claim 1, wherein the first inductor is defined by a leakage inductance of the transformer.

4. The switching power supply device according to claim 1, wherein at least one of the first switch element, the second switch element, and the third switch element is defined by a field effect transistor.

5. The switching power supply device according to claim 1, further comprising:
a first delay circuit defined by a series circuit including a resistor and a capacitor and being connected between a control terminal of the first switch element and the first drive coil;
a second delay circuit defined by a series circuit including a resistor and a capacitor and being connected between a control terminal of the second switch element and the second drive coil; and
a third delay circuit defined by a series circuit including a resistor and a capacitor and being connected between a control terminal of the third switch element and the first drive coil; wherein the first, second, and third switching control circuits respectively turn on the first, second, and third switch elements after delaying voltages, which turn on the switch elements, by the first, second, and third delay circuits for predetermined periods of time since the voltages have been respectively generated at the first and second drive coils.

6. The switching power supply device according to claim 5, wherein delayed periods of the first, second and third delay circuits are respectively set such that drain-source voltages or collector-emitter voltages of the first switch element, the second switch element, and the third switch element decrease to zero voltage or a voltage near zero and then the first switch element, the second switch element, and the third switch element turn on.

7. The switching power supply device according to claim 1, wherein the first switching control circuit includes a first transistor and a first time-constant circuit, the second switching control circuit includes a second transistor and a second time-constant circuit, the third switching control circuit includes a third transistor and a third time-constant circuit, and the first transistor, the second transistor, or the third transistor turns on by a voltage generated at the first or second drive coil after a period of time set by the first time-constant circuit, the second time-constant circuit, or the third time-constant circuit, and the first switch element, the second switch element, or the third switch element turns off accordingly.

8. The switching power supply device according to claim 1, further comprising:
a feedback circuit provided downstream of the rectifying/smoothing circuit; wherein
the feedback circuit is arranged to monitor an output voltage that is output to the secondary side of the transformer through the rectifying/smoothing circuit, the feedback circuit includes an isolation element arranged to transmit a feedback signal to the primary side in an electrically isolated manner when the output voltage exceeds a predetermined value, the feedback circuit immediately turns on the first transistor when receiving the feedback signal to cause the first switch element to turn off.

9. The switching power supply device according to claim 8, wherein the isolation element is a photocoupler.

10. The switching power supply device according to claim 1, further comprising:
a feedback circuit arranged to monitor a voltage between both ends of the fifth capacitor; wherein
the feedback circuit immediately turns on the third transistor when the voltage between both ends of the fifth capacitor exceeds a predetermined value to cause the third switch element to turn off.

11. A switching power supply device comprising:
a first switch circuit defined by a parallel-connected circuit including a first switch element, a first diode, and a first capacitor;
a second switch circuit defined by a parallel-connected circuit including a second switch element, a second diode, and a second capacitor;
a third switch circuit defined by a parallel-connected circuit including a third switch element, a third diode, and a third capacitor;
an input-side rectifier circuit including at least one rectifying element arranged to rectify an alternating input voltage;
a fourth capacitor to which a voltage rectified by the input-side rectifier circuit is applied;
a transformer including at least a primary coil, a secondary coil, a first drive coil, and a second drive coil;
a rectifying/smoothing circuit connected to the secondary coil
a first inductor connected in series with the primary coil;
a second inductor connected such that a voltage of the fourth capacitor is applied to the second inductor during an on period of the third switch circuit that operates such that the on period of the third switch circuit is included in an on period of the first switch circuit;
a fourth diode including an anode connected to one end of the second inductor and a cathode connected to one end of the second switch element in order to prevent a backward current from flowing to the second inductor;
a fifth capacitor connected such that the fifth capacitor is charged with exciting energy stored in the second inductor and applies a voltage to a series circuit defined by the primary coil, the first inductor, and a sixth capacitor, during an on period of the first switch circuit;
the sixth capacitor being inserted in series between the fifth capacitor and the first inductor;
a first switching control circuit and a second switching control circuit arranged to alternately turn on or off the first and second switch elements with an intervening period during which both the first and second switch elements turn off; and
a switching control circuit arranged to turn on or off the third switch element; wherein
each of the first switching control circuit and the third switching control circuit operates on a voltage generated at the first drive coil, and the second switching control circuit operates on a voltage generated at the second drive coil.

12. The switching power supply device according to claim 11, further comprising a fifth diode including an anode terminal connected to the input-side rectifier circuit and a cathode terminal connected to the fifth capacitor.

13. The switching power supply device according to claim 11, wherein the first inductor is defined by a leakage inductance of the transformer.

14. The switching power supply device according to claim 11, wherein at least one of the first switch element, the second switch element, and the third switch element is defined by a field effect transistor.

15. The switching power supply device according to claim 11, further comprising:
a first delay circuit defined by a series circuit including a resistor and a capacitor and being connected between a control terminal of the first switch element and the first drive coil;
a second delay circuit defined by a series circuit including a resistor and a capacitor and being connected between a control terminal of the second switch element and the second drive coil; and
a third delay circuit defined by a series circuit including a resistor and a capacitor and being connected between a control terminal of the third switch element and the first drive coil; wherein
the first, second, and third switching control circuits respectively turn on the first, second, and third switch elements after delaying voltages, which turn on the switch elements, by the first, second, and third delay circuits for predetermined periods of time since the voltages have been respectively generated at the first and second drive coils.

16. The switching power supply device according to claim 15, wherein delayed periods of the first, second and third delay circuits are respectively set such that drain-source voltages or collector-emitter voltages of the first switch element, the second switch element, and the third switch element decrease to zero voltage or a voltage near zero and then the first switch element, the second switch element, and the third switch element turn on.

17. The switching power supply device according to claim 11, wherein the first switching control circuit includes a first transistor and a first time-constant circuit, the second switching control circuit includes a second transistor and a second time-constant circuit, the third switching control circuit includes a third transistor and a third time-constant circuit, and the first transistor, the second transistor, or the third transistor turns on by a voltage generated at the first or second drive coil after a period of time set by the first time-constant circuit, the second time-constant circuit, or the third time-constant circuit, and the first switch element, the second switch element, or the third switch element turns off accordingly.

18. The switching power supply device according to claim 11, further comprising:
a feedback circuit provided downstream of the rectifying/smoothing circuit; wherein
the feedback circuit monitors an output voltage that is output to the secondary side of the transformer through the rectifying/smoothing circuit, the feedback circuit includes an isolation element arranged to transmit a feedback signal to the primary side in an electrically isolated manner when the output voltage exceeds a predetermined value, the feedback circuit immediately turns on the first transistor when receiving the feedback signal to cause the first switch element to turn off.

19. The switching power supply device according to claim 18, wherein the isolation element is a photocoupler.

20. The switching power supply device according to claim 11, further comprising:
a feedback circuit arranged to monitor a voltage between both ends of the fifth capacitor; wherein
the feedback circuit immediately turns on the third transistor when the voltage between both ends of the fifth capacitor exceeds a predetermined value to cause the third switch element to turn off.

21. A switching power supply device comprising:
a first switch circuit defined by a parallel-connected circuit including a first switch element, a first diode, and a first capacitor;
a second switch circuit defined by a parallel-connected circuit including a second switch element, a second diode, and a second capacitor;
a third switch circuit defined by a parallel-connected circuit including a third switch element, a third diode, and a third capacitor;
an input-side rectifier circuit including at least one rectifying element arranged to rectify an alternating input voltage;
a fourth capacitor, to which a voltage rectified by the input-side rectifier circuit is applied;
a transformer including at least a primary coil, a secondary coil, a first drive coil, and a second drive coil;
a rectifying/smoothing circuit connected to the secondary coil;
a first inductor connected in series with the primary coil;
a second inductor connected such that a voltage of the fourth capacitor is applied to the second inductor during an on period of the third switch circuit that operates such that the on period of the third switch circuit is included in an on period of the first switch circuit;
a fifth capacitor connected such that the fifth capacitor is charged with exciting energy stored in the second inductor and applies a voltage to a series circuit defined by the primary coil, the first inductor, and a sixth capacitor, during an on period of the first switch circuit;
the sixth capacitor including one end connected to the primary coil of the transformer and another end connected to a connecting point of the first switch circuit and the second switch circuit;
a fourth diode including an anode connected to one end of the second inductor and a cathode connected to a connecting point of the primary coil of the transformer and the sixth capacitor in order to prevent a backward current from flowing to the second inductor;
a first switching control circuit and a second switching control circuit arranged to alternately turn on or off the first and second switch elements with an intervening period during which both the first and second switch elements turn off; and
a switching control circuit arranged to turn on or off the third switch element; wherein
each of the first switching control circuit and the third switching control circuit operates on a voltage generated at the first drive coil, and the second switching control circuit operates on a voltage generated at the second drive coil.

22. The switching power supply device according to claim 21, further comprising a fifth diode including an anode terminal connected to the input-side rectifier circuit and a cathode terminal connected to the fifth capacitor.

23. The switching power supply device according to claim 21, wherein the first inductor is defined by a leakage inductance of the transformer.

24. The switching power supply device according to claim 21, wherein at least one of the first switch element, the second switch element, and the third switch element is defined by a field effect transistor.

25. The switching power supply device according to claim 21, further comprising:
a first delay circuit defined by a series circuit including a resistor and a capacitor and being connected between a control terminal of the first switch element and the first drive coil;
a second delay circuit defined by a series circuit including a resistor and a capacitor and being connected between a control terminal of the second switch element and the second drive coil; and
a third delay circuit defined by a series circuit including a resistor and a capacitor and being connected between a control terminal of the third switch element and the first drive coil; wherein
the first, second, and third switching control circuits respectively turn on the first, second, and third switch elements after delaying voltages, which turn on the switch elements, by the first, second, and third delay circuits for predetermined periods of time since the voltages have been respectively generated at the first and second drive coils.

26. The switching power supply device according to claim 25, wherein delayed periods of the first, second and third delay circuits are respectively set such that drain-source voltages or collector-emitter voltages of the first switch element, the second switch element, and the third switch element decrease to zero voltage or a voltage near zero and then the first switch element, the second switch element, and the third switch element turn on.

27. The switching power supply device according to claim 21, wherein the first switching control circuit includes a first transistor and a first time-constant circuit, the second switching control circuit includes a second transistor and a second time-constant circuit, the third switching control circuit includes a third transistor and a third time-constant circuit, and the first transistor, the second transistor, or the third transistor turns on by a voltage generated at the first or second drive coil after a period of time set by the first time-constant circuit, the second time-constant circuit, or the third time-constant circuit, and the first switch element, the second switch element, or the third switch element turns off accordingly.

28. The switching power supply device according to claim 21, further comprising:
a feedback circuit provided downstream of the rectifying/smoothing circuit; wherein
the feedback circuit monitors an output voltage that is output to the secondary side of the transformer through the rectifying/smoothing circuit, the feedback circuit includes an isolation element arranged to transmit a feedback signal to the primary side in an electrically isolated manner when the output voltage exceeds a predetermined value, the feedback circuit immediately turns on the first transistor when receiving the feedback signal to cause the first switch element to turn off.

29. The switching power supply device according to claim 28, wherein the isolation element is a photocoupler.

30. The switching power supply device according to claim 21, further comprising:
a feedback circuit arranged to monitors a voltage between both ends of the fifth capacitor; wherein
the feedback circuit immediately turns on the third transistor when the voltage between both ends of the fifth capacitor exceeds a predetermined value to cause the third switch element to turn off.

31. A switching power supply device comprising:
a first switch circuit defined by a parallel-connected circuit including a first switch element, a first diode, and a first capacitor;
a second switch circuit defined by a parallel-connected circuit including a second switch element, a second diode, and a second capacitor;
a third switch circuit defined by a parallel-connected circuit including a third switch element, a third diode, and a third capacitor;
an input-side rectifier circuit including at least one rectifying element arranged to rectify an alternating input voltage;
a fourth capacitor, to which a voltage rectified by the input-side rectifier circuit is applied;
a transformer including at least a primary coil, a secondary coil, a first drive coil, and a second drive coil;
a rectifying/smoothing circuit connected to the secondary coil;
a first inductor connected in series with the primary coil;
a second inductor connected such that a voltage of the fourth capacitor is applied to the second inductor during an on period of the third switch circuit that operates such that the on period of the third switch circuit is included in an on period of the first switch circuit;
a fifth capacitor connected such that the fifth capacitor is charged with exciting energy stored in the second inductor and applies a voltage to a series circuit defined by the primary coil and the first inductor, during an on period of the first switch circuit;
a sixth capacitor defining a series circuit, which is connected in parallel with both ends of the first switch circuit, with the second switch circuit;
a first switching control circuit and a second switching control circuit arranged to alternately turn on or off the first and second switch elements with an intervening period during which both the first and second switch elements turn off; and
a switching control circuit arranged to turn on or off the third switch element; wherein
each of the first switching control circuit and the third switching control circuit operates on a voltage generated at the first drive coil, and the second switching control circuit operates on a voltage generated at the second drive coil.

32. The switching power supply device according to claim 31, further comprising a fifth diode including an anode terminal connected to the input-side rectifier circuit and a cathode terminal connected to the fifth capacitor.

33. The switching power supply device according to claim 31, wherein the first inductor is defined by a leakage inductance of the transformer.

34. The switching power supply device according to claim 31, wherein at least one of the first switch element, the second switch element, and the third switch element is defined by a field effect transistor.

35. The switching power supply device according to claim 31, further comprising:
a first delay circuit defined by a series circuit including a resistor and a capacitor and being connected between a control terminal of the first switch element and the first drive coil;
a second delay circuit defined by a series circuit including a resistor and a capacitor and being connected between a control terminal of the second switch element and the second drive coil; and
a third delay circuit defined by a series circuit including a resistor and a capacitor and being connected between a control terminal of the third switch element and the first drive coil;
wherein
the first, second, and third switching control circuits respectively turn on the first, second, and third switch elements after delaying voltages, which turn on the switch elements, by the first, second, and third delay circuits for predetermined periods of time since the voltages have been respectively generated at the first and second drive coils.

36. The switching power supply device according to claim 35, wherein delayed periods of the first, second and third delay circuits are respectively set such that drain-source voltages or collector-emitter voltages of the first switch element, the second switch element, and the third switch element decrease to zero voltage or a voltage near zero and then the first switch element, the second switch element, and the third switch element turn on.

37. The switching power supply device according to claim 31, wherein the first switching control circuit includes a first transistor and a first time-constant circuit, the second switching control circuit includes a second transistor and a second time-constant circuit, the third switching control circuit includes a third transistor and a third time-constant circuit, and the first transistor, the second transistor, or the third transistor turns on by a voltage generated at the first or second drive coil after a period of time set by the first time-constant circuit, the second time-constant circuit, or the third time-constant circuit, and the first switch element, the second switch element, or the third switch element turns off accordingly.

38. The switching power supply device according to claim 31, further comprising:
a feedback circuit provided downstream of the rectifying/smoothing circuit; wherein
the feedback circuit monitors an output voltage that is output to the secondary side of the transformer through the rectifying/smoothing circuit, the feedback circuit includes an isolation element arranged to transmit a feedback signal to the primary side in an electrically isolated manner when the output voltage exceeds a predetermined value, the feedback circuit immediately turns on the first transistor when receiving the feedback signal to cause the first switch element to turn off.

39. The switching power supply device according to claim 38, wherein the isolation element is a photocoupler.

40. The switching power supply device according to claim 31, further comprising:
a feedback circuit arranged to monitors a voltage between both ends of the fifth capacitor; wherein
the feedback circuit immediately turns on the third transistor when the voltage between both ends of the fifth capacitor exceeds a predetermined value to cause the third switch element to turn off.

* * * * *